(12) United States Patent
Konishi et al.

(10) Patent No.: US 11,945,487 B2
(45) Date of Patent: Apr. 2, 2024

(54) COMMODITY PICKUP APPARATUS

(71) Applicant: TOSHIBA TEC KABUSHIKI KAISHA, Tokyo (JP)

(72) Inventors: Shota Konishi, Kawasaki Kanagawa (JP); Kanya Hiroi, Yokohama Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 306 days.

(21) Appl. No.: 17/473,921

(22) Filed: Sep. 13, 2021

(65) Prior Publication Data

US 2022/0180277 A1 Jun. 9, 2022

(30) Foreign Application Priority Data

Dec. 4, 2020 (JP) ................. 2020-201862

(51) Int. Cl.
*B62B 3/00* (2006.01)
*B62B 3/14* (2006.01)
*G06K 7/10* (2006.01)
*G06K 7/14* (2006.01)

(52) U.S. Cl.
CPC ........ *B62B 3/1416* (2013.01); *G06K 7/10861* (2013.01); *G06K 7/1447* (2013.01); *G06K 7/1413* (2013.01); *G06K 7/1417* (2013.01)

(58) Field of Classification Search
CPC .... B62B 3/1416; B62B 3/00; G06K 7/10861; G06K 7/1447; G06K 7/1413; G06K 7/1417
USPC .................................. 280/33.991
See application file for complete search history.

(56) References Cited

U.S. PATENT DOCUMENTS

| 10,266,196 | B1 * | 4/2019 | Sinha | ............. B62B 3/008 |
|---|---|---|---|---|
| 10,592,962 | B1 * | 3/2020 | Lauka | ............. G06K 7/10881 |
| 2019/0325377 | A1 * | 10/2019 | Rajkhowa | ............. G06Q 10/04 |
| 2020/0275059 | A1 * | 8/2020 | De Bonet | ............. G06V 20/52 |
| 2021/0177163 | A1 * | 6/2021 | Cohn | ............. G07G 1/0072 |
| 2021/0383458 | A1 * | 12/2021 | Crawford | ............. G06Q 10/087 |

FOREIGN PATENT DOCUMENTS

JP 2019-210124 A 12/2019

OTHER PUBLICATIONS

Yanai, "The Current State and Future Directions on Generic Object Recognition" Journal of Information Processing Society of Japan, vol. 48, No. SIG16, Nov. 2007, pp. 1-24 (with English abstract).
J. Shotton et al. "Semantic Texton Forests for Image Categorization and Segmentation" 2008 IEEE Conference on Computer Vision and Pattern Recognition, 2008, pp. 1-8.

* cited by examiner

*Primary Examiner* — James A Shriver, II
*Assistant Examiner* — Hilary L Johns
(74) *Attorney, Agent, or Firm* — Kim & Stewart LLP

(57) ABSTRACT

According to an embodiment, a commodity pickup apparatus obtains information related to a commodity to be picked up and the number of pieces thereof. The commodity pickup apparatus displays, on the display device, a list of commodities to be put in the plurality of accommodation portions on the basis of the obtained information in an arrangement state equal to an arrangement state of the plurality of accommodation portions when viewed from an operator of the apparatus.

8 Claims, 22 Drawing Sheets

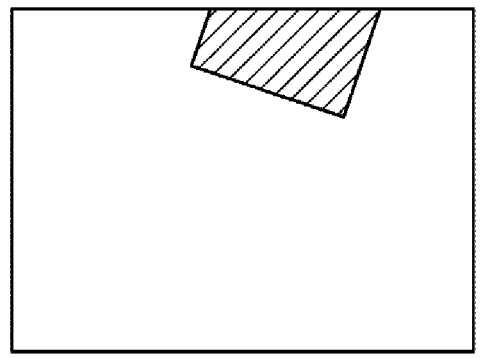
I(t)
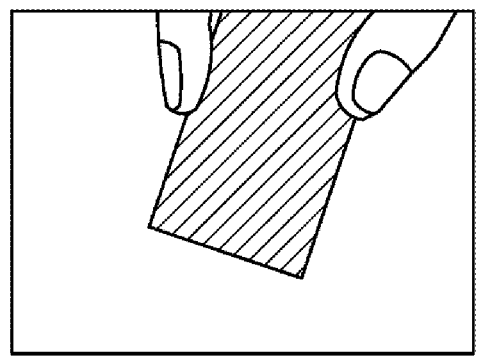
I(t+Δt)
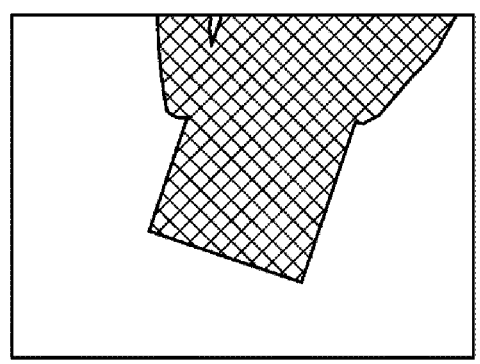
J(t+Δt)
=I(t+Δt)−I(t)
Fig.8

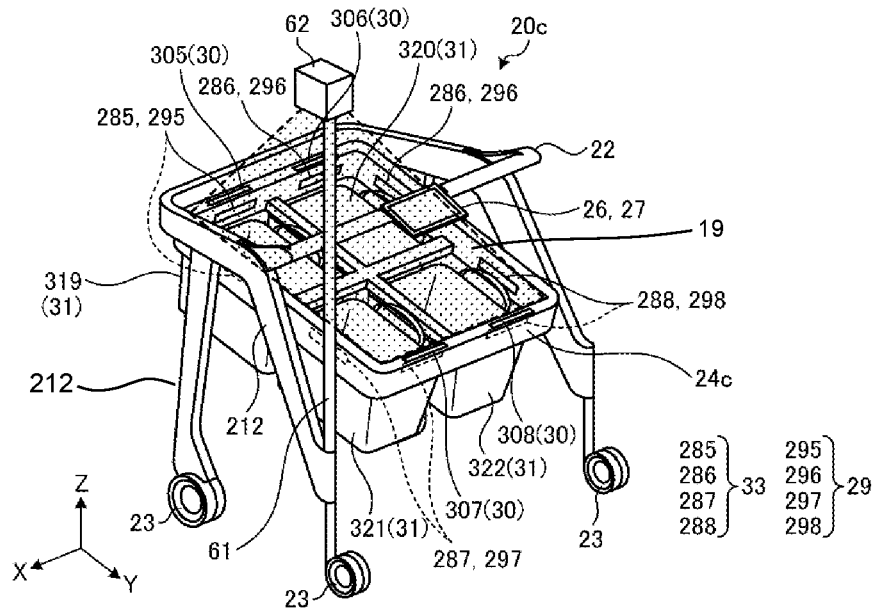
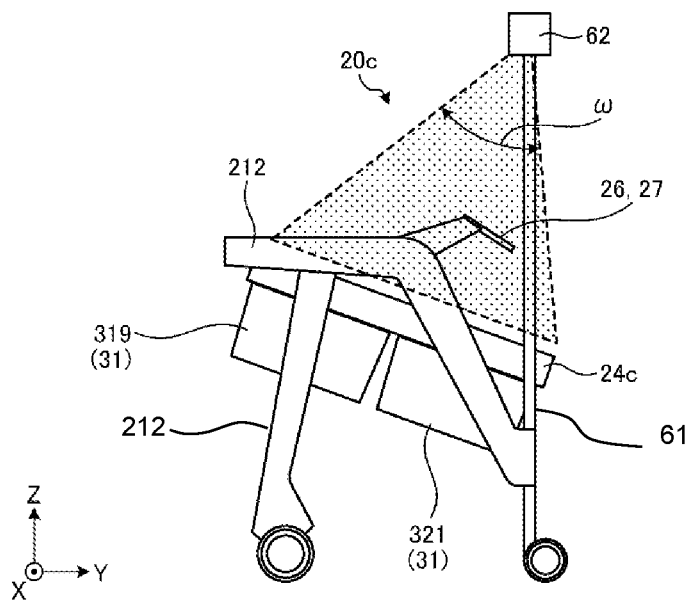
Fig.19

COMMODITY PICKUP APPARATUS

CROSS-REFERENCE TO RELATED APPLICATIONS

This application is based upon and claims the benefit of priority from the prior Japanese Patent Application No. 2020-201862, filed on Dec. 4, 2020, the entire contents of which are incorporated herein by reference.

FIELD

Embodiments described herein generally relate to a commodity pickup apparatus.

BACKGROUND

When doing shopping in stores such as supermarkets and convenience stores, customers order commodities to be purchased, and persons in charge of the stores collect the ordered commodities, that is, pick up the commodities and send the commodities picked up to the customers. Such a purchasing form is proposed.

For example, there is known an article picking apparatus that accommodates picked-up articles on a predetermined table.

The article picking apparatus described above displays, on a display unit, on which table the picked-up articles are put in a transport container. However, the arrangement of the tables displayed on the display unit and the arrangement of the tables provided in the picking apparatus do not have an easy-to-understand correspondence relationship, and thus there is a problem in that the accommodation location of the articles is hard to find.

BRIEF DESCRIPTION OF THE DRAWINGS

FIG. 8 is a view for describing a method of detecting that a commodity is put from images captured by the cameras installed in the cart according to the embodiment.

FIG. 19 is an overall perspective view and a side view showing an example of a cart of a commodity pickup system according to a second embodiment.

DETAILED DESCRIPTION

Figure 1:
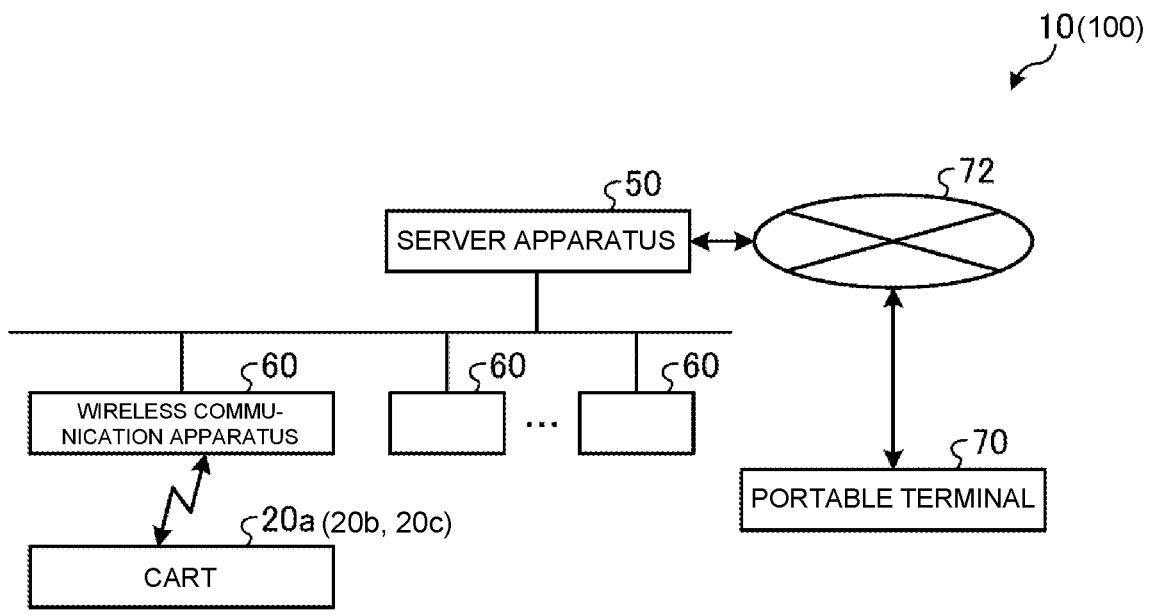
FIG. 1 is a block diagram showing an example of a system configuration of a commodity pickup system according to an embodiment.

According to one embodiment, a commodity pickup apparatus includes a plurality of accommodation portions that are detachably mounted and accommodate commodities picked up in accordance with an order from a customer, and is movable in accordance with an operation by an operator. The commodity pickup apparatus includes a communication interface, a display device, and a controller. The communication interface communicates with an external server to receive commodity pickup information, the commodity pickup information including information related to a commodity to be picked up and the number of pieces thereof. The display device displays a list of commodities to be picked up and accommodated in the plurality of accommodation portions. The controller obtains the commodity pickup information via the communication interface. The controller causes the display device to display, for each of the plurality of accommodation portions, the list of commodities to be accommodated in each of the plurality of accommodation portions on the basis of the obtained commodity pickup information. The list of commodities is displayed on a display screen of the display device in an arrangement state equal to an arrangement state of the plurality of accommodation portions when viewed from the operator who operates the commodity pickup apparatus.

First Embodiment

A commodity pickup system 10 as a first embodiment will be described with reference to the drawings. The same reference symbols in the drawings will denote the same or similar portions.

(Overall Configuration of Commodity Pickup System)

First, an overall configuration of the commodity pickup system 10 will be described with reference to FIG. 1. FIG. 1 is a block diagram showing an exemplary system configuration of the commodity pickup system of the first embodiment.

The commodity pickup system 10 includes a cart 20a, a server apparatus 50, and a portable terminal 70. The cart 20a is pushed by an operator to be moved in a store or in the backyard. The cart 20a includes a frame member on which an accommodation unit (basket or bag) for accommodating commodities, which are ordered by a customer and picked up by a picker in the store or in the backyard, is mounted (for details, see FIG. 2). Although a single cart 20a is shown in FIG. 1, a plurality carts 20a may be present. Each cart 20a is given a unique identification number for identifying an individual cart. Note that the cart 20a is an example of a commodity pickup apparatus in this embodiment.

The server apparatus 50 receives the order of commodities from the portable terminal 70 of a customer, such as a smartphone, a tablet terminal, or a personal computer, via the Internet 72. Further, the server apparatus 50 generates commodity pickup information including commodities to be picked up and the number of pieces thereof on the basis of the order received from the customer. Furthermore, the server apparatus 50 transmits the generated commodity pickup information to the cart 20a. Note that the commodity pickup information may include path information (pickup path information) indicating a movement path for efficiently picking up all of the ordered commodities.

In the store, a plurality of wireless communication apparatuses 60 connected to the server apparatus 50 are installed. The server apparatus 50 transmits the commodity pickup information and the pickup path information to the cart 20a via the wireless communication apparatus 60 having the best communication state.

The operator of the cart 20a moves the cart 20a to carry commodities. In this sense, in the following description, the operator of the cart 20a will be referred to as a carrier of the cart 20a or simply as a carrier. Further, the picker picks up the commodities to be picked up from the commodity display shelves in the store or in the backyard and accommodates the commodities in a basket or bag mounted on the cart 20a. In this embodiment, the carrier of the cart 20a also serves as the picker for picking up commodities. Therefore, in the following description, the carrier refers to the operator of the cart 20a and also refers to the picker for commodities. The cart 20a then detects the accommodated commodities and determines whether or not the correct commodities have been accommodated. Note that a configuration of the cart 20a will be described in detail later (see FIG. 2, for example).

(Overall Configuration of Cart)

Figure 2:
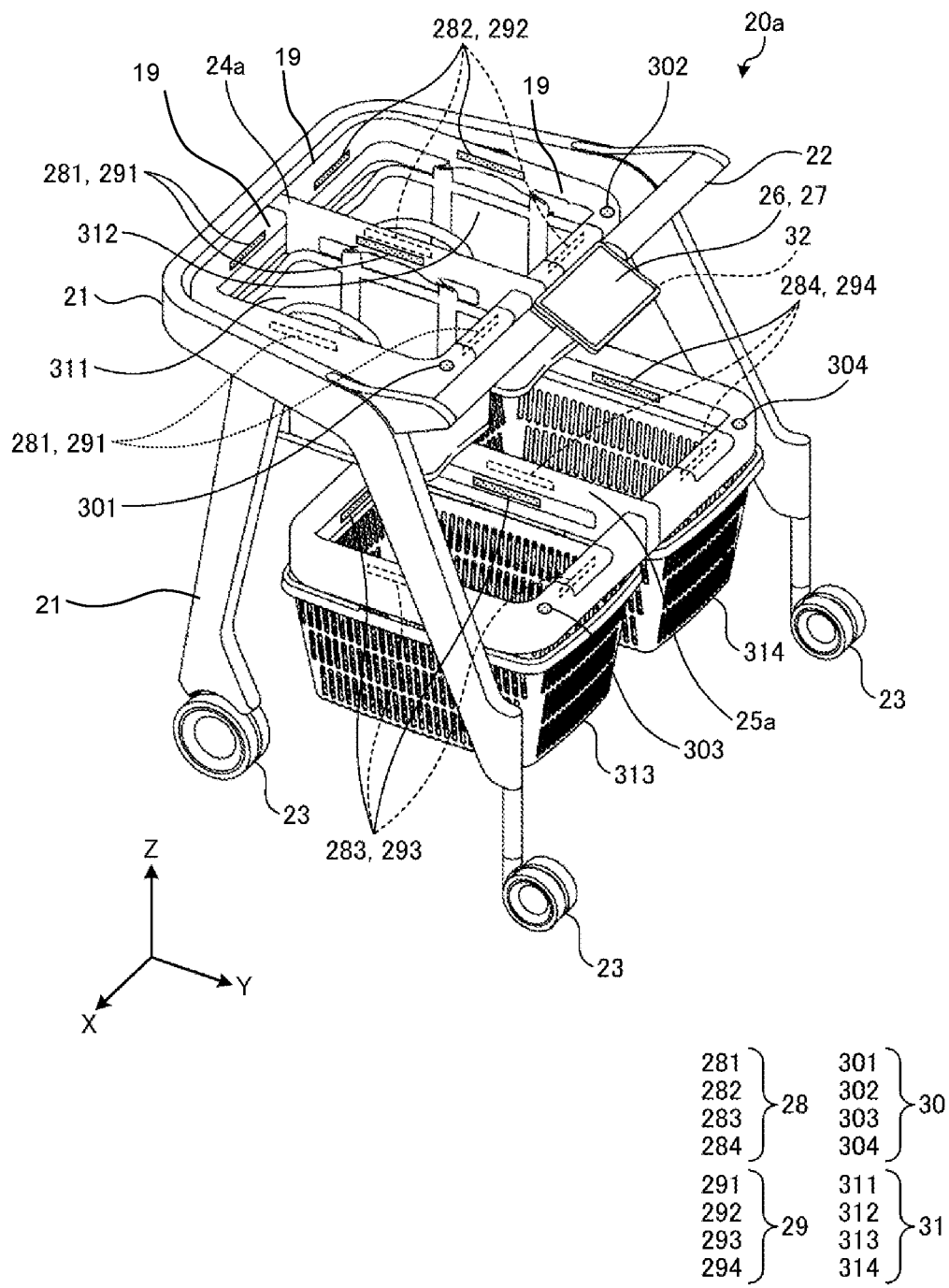
FIG. 2 is an overall perspective view showing an example of a use state of a cart as an example of a commodity pickup apparatus according to the embodiment.

Next, an overall configuration of the cart 20a will be described with reference to FIG. 2. FIG. 2 is an overall perspective view of the cart 20a, which is an example of the commodity pickup apparatus. Note that the Z-axis in the drawing is a vertical direction. The X-axis and the Y-axis in the drawing are directions perpendicular to each other and are also horizontal directions perpendicular to the Z-axis direction. Further, in the following description, the arrow direction of each axis in the drawing will be referred to as a positive direction, and the direction opposite to the arrow direction will be referred to as a negative direction. Specifically, for example, in FIG. 2, the arrow direction of the X-axis will be referred to as the X-axis positive direction, and the direction opposite to the arrow direction of the X-axis will be referred to as the X-axis negative direction. Further, for example, the X-axis positive direction and the X-axis negative direction will be collectively referred to simply as the X-axis direction.

As shown in FIG. 2, the cart 20a including a frame 21 as the main constituent member includes a handle 22 and four casters 23 (leg portions) attached to the frame 21. The handle 22 is located on the backward direction side of the cart 20a and receives a force applied by the grip of the carrier. The casters 23 are small wheels and freely change the direction of the cart 20a, i.e., the traveling direction of the cart 20a in accordance with the direction of the force applied to the handle 22 gripped by the carrier who moves the cart 20a. In FIG. 2, when the direction of the force applied to the handle 22 by the carrier is, for example, the Y-axis negative direction or the X-axis negative direction, the cart 20a moves in the Y-axis negative direction or the X-axis negative direction. When the direction of the force applied to the handle 22 by the carrier is, for example, the Y-axis positive direction or the X-axis positive direction, the cart 20a moves in the Y-axis positive direction or the X-axis positive direction. Here, the Y-axis negative direction is the forward direction of the cart 20a, and the Y-axis positive direction is the backward direction of the cart 20a. The carrier grips the handle 22 and moves the cart 20a in the store while changing the traveling direction by the casters 23. Note that, when viewed from the carrier who grips the handle 22, the width Wa of the frame 21 on the far side (width in the X-axis direction) is formed narrower than the width Wb thereof on the carrier side, i.e., the near side (width in the X-axis direction) (see FIG. 3). In other words, the far side of the frame 21 when viewed from the carrier side is the forward direction side of the cart 20a. Further, the carrier side or the near side is the backward direction side of the cart 20a. The distance between the two casters 23 on the far side when viewed from the carrier who grips the handle 22 is narrower than the distance between the two casters 23 on the near side. Note that the frame 21 is an example of a support member in this embodiment.

A container installation frame 24a is provided at the upper portion of the frame 21. A container installation frame 25a is provided at the lower portion of the frame 21. The container installation frame 24a is a frame member in which two different bags 311 and 312 can be detachably installed. The container installation frame 25a is a frame member in which two different baskets 313 and 314 can be detachably installed. The carrier distinguishes and accommodates commodities corresponding to different orders in the bags 311 and 312 and the baskets 313 and 314. Note that, in the example shown in FIG. 2, the bags 311 and 312 are installed in the container installation frame 24a, and the baskets 313 and 314 are installed in the container installation frame 25a, but the embodiment is not limited to this example. In other words, only the bags may be installed in both of the container installation frames 24a and 25a, or only the baskets may be installed in both of the container installation frames 24a and 25a. The bags 311 and 312 and the baskets 313 and 314 are examples of an accommodation portion 31 of this embodiment. Further, the container installation frames 24a and 25a are examples of a first frame member of this embodiment. Note that the lower container installation frame 25a is disposed on the side of the carrier who carries the cart 20a by gripping the handle 22 (handle 22 side) relative to the upper container installation frame 24a (see FIG. 2, for example). In other words, the upper container installation frame 24a is disposed on the far side from the carrier relative to the lower container installation frame 25a.

A display device 26 is attached to the handle 22. The display device 26 includes, for example, a liquid crystal panel or an organic EL panel, and displays image information thereon. The display device 26 displays a list of commodities to be picked up, a movement path for efficiently picking up commodities, or the like (for details, see FIG. 9). Further, a touch panel 27 is provided to the display surface of the display device 26 while being laminated on the display surface. The display device 26 receives an operation input of the carrier. The display device 26 may be, for example, a portable terminal such as a tablet terminal or a smartphone.

A global positioning system (GPS) receiver 32 is installed inside the casing of the display device 26. The GPS receiver 32 receives GPS signals output from a GPS satellite to perform positioning to specify its own position, and thus specifies the current position and the traveling direction of the cart 20a in the store. Note that the method of specifying the current position of the cart 20a is not limited to the GPS positioning. For example, communication may be performed with the plurality of wireless communication apparatuses 60, and the self-position of the cart 20a may be specified on the basis of the intensity of the signals received from the respective wireless communication apparatuses 60. Alternatively, the self-position of the cart 20a may be specified by receiving reference signals output from a plurality of beacon posts installed in the store.

A plurality of cameras 28 (281, 282, 283, and 284) and a plurality of illumination light sources 29 (291, 292, 293, and 294) are installed on the four inner surfaces (inner circumferential surfaces) 19 of the container installation frames 24a and 25a so as to face the inside of the container installation frames 24a and 25a, i.e., the inside of the bags 311 and 312 and the baskets 313 and 314 mounted on the container installation frames 24a and 25a. The illumination light source 29 is, for example, a light emitting diode (LED). Hereinafter, the illumination light source 29 will be referred to as an illumination LED 29. Further, more specifically, four cameras 281 and four illumination LEDs 291 are installed in the position where the bag 311 is mounted on the container installation frame 24a. The four cameras 281 are installed at respective positions with the equal height in the Z-axis direction and substantially horizontally installed along the X-axis and the Y-axis. Note that the installation positions of the cameras 281 will be described in detail later (see FIG. 7). The four cameras 281 capture images of a region, through which a commodity is expected to pass, from four different directions when the commodity is put in the bag 311. Note that FIG. 2 does not show the specific installation positions of the illumination LEDs 291 clearly, but the illumination LEDs 291 are installed in the vicinity of the respective cameras 281 to illuminate at least the imaging ranges of the respective cameras 281. Note that the camera 28 is an example of a first imaging device in this embodiment.

Similarly, four cameras 282 and four illumination LEDs 292 are installed in the position where the bag 312 is mounted on the container installation frame 24a. Further, four cameras 283 and four illumination LEDs 293 are installed in the position where the basket 313 is mounted on the container installation frame 25a. In addition, four cameras 284 and four illumination LEDs 294 are installed in the position where the basket 314 is mounted on the container installation frame 25a.

Further, guide lights 30 (301, 302, 303, and 304) are installed in the container installation frames 24a and 25a at positions visible from the carrier who moves the cart 20a. The guide light 301 is an indicator to indicate that a commodity to be picked up next is to be put in the bag 311. The guide light 302 is an indicator to indicate that a commodity to be picked up next is to be put in the bag 312. The guide light 303 is an indicator to indicate that a commodity to be picked up next is to be put in the basket 313. The guide light 304 is an indicator to indicate that a commodity to be picked up next is to be put in the basket 314.

Note that, when the cart 20a is moved along the pickup path information described above, a commodity at the nearest position is selected as the commodity to be picked up next. The cart 20a turns on the guide light 30 corresponding to the accommodation position of the commodity. Note that the lighted guide light 30 is turned off when it is detected that the correct commodity is put at a predetermined position. The cart 20a then turns on the guide light 30 corresponding to the accommodation position of a commodity to be picked up next.

(Mounting Structure of Container Installation Frame)

Figure 3:
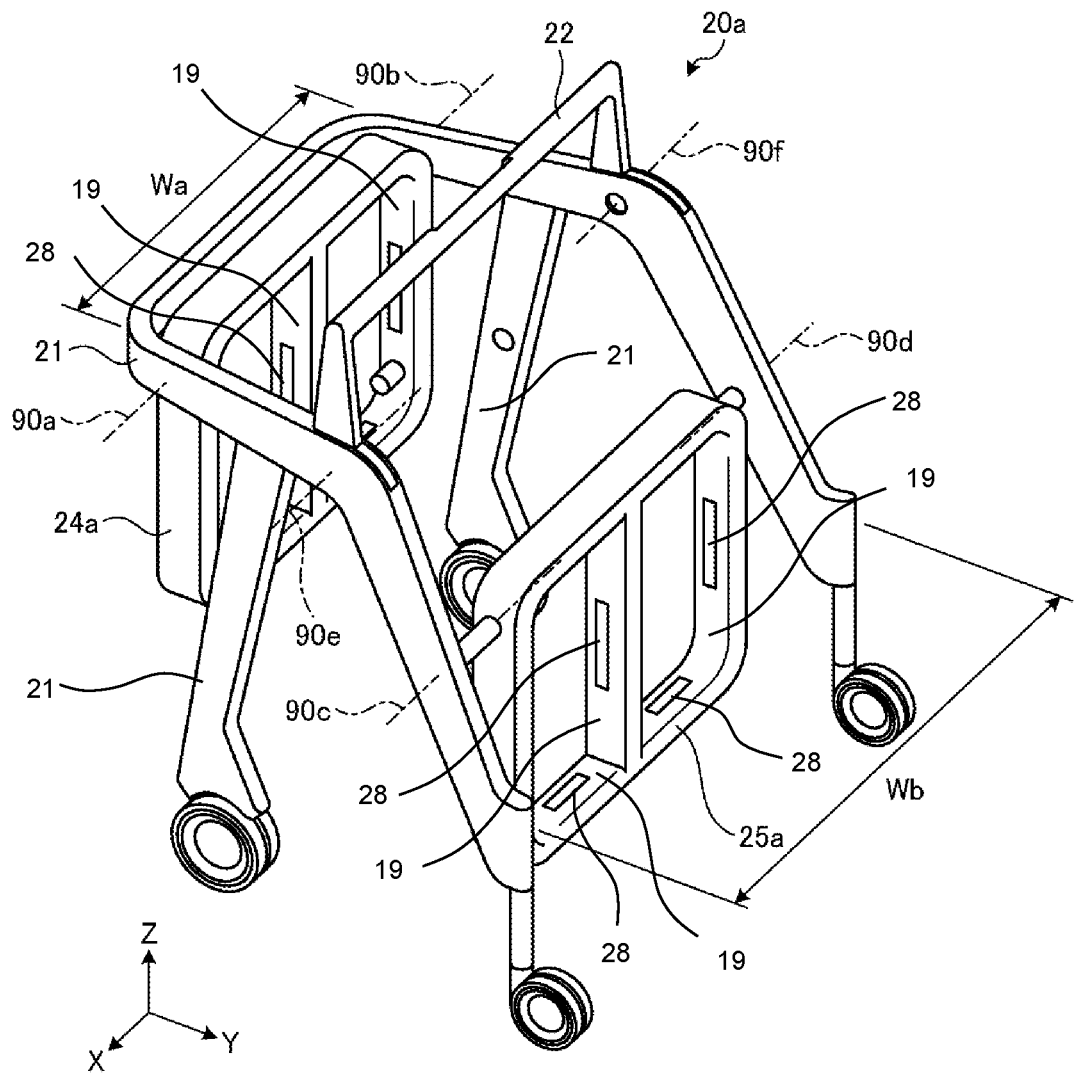
FIG. 3 is an overall perspective view showing an example of a stacking state of the cart according to the embodiment.
Figure 4:
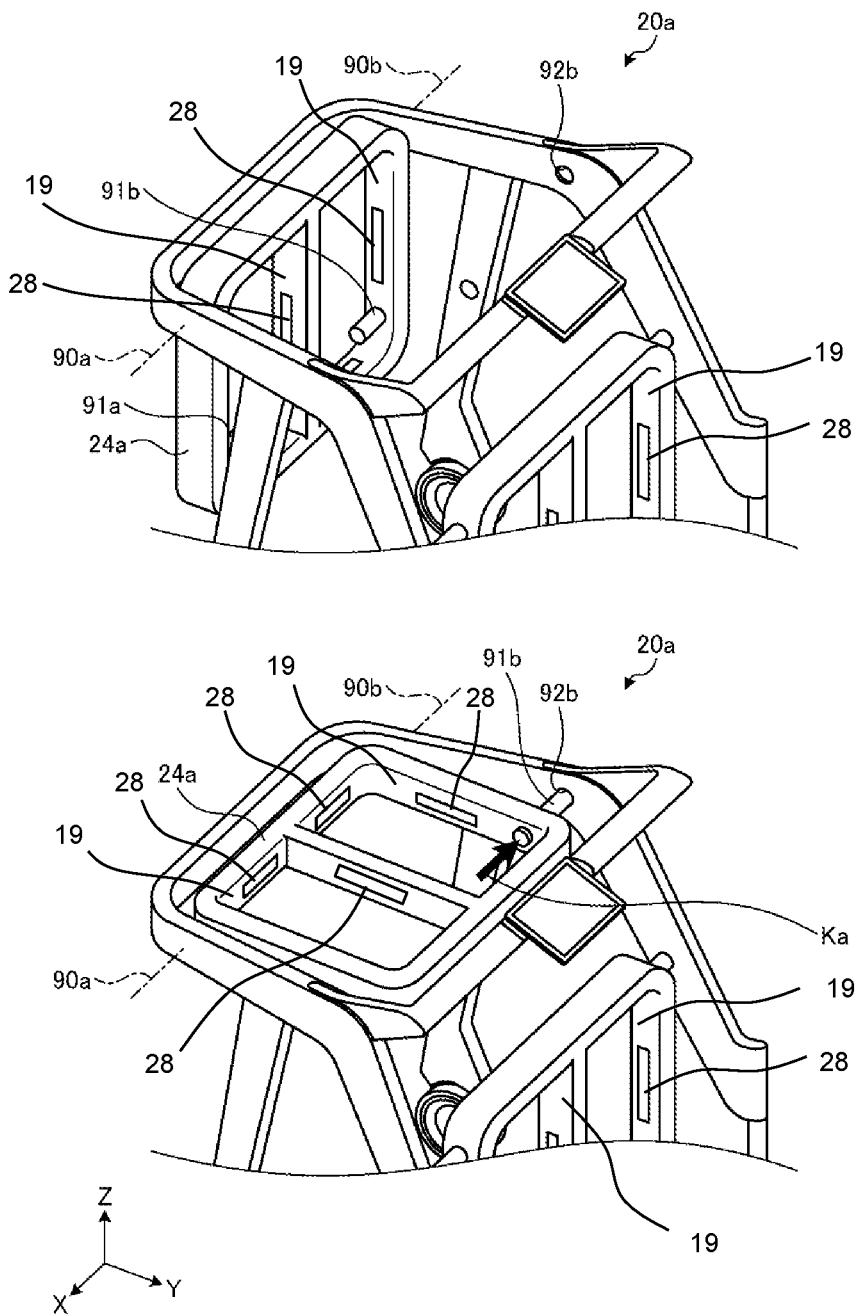
FIG. 4 is a view for describing a rotation mechanism of an upper container installation frame of the cart according to the embodiment.
Figure 5:
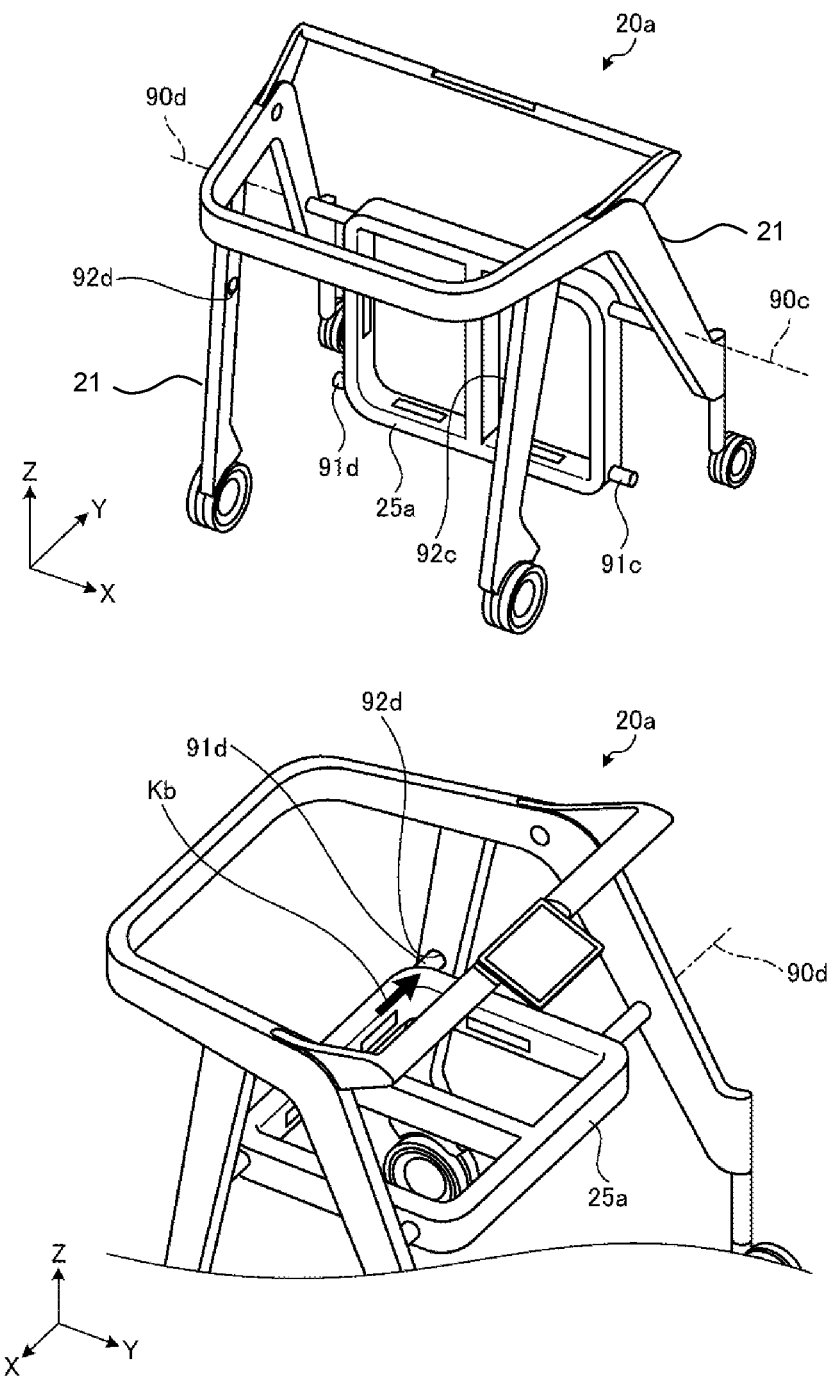
FIG. 5 is a view for describing a rotation mechanism of a lower container installation frame of the cart according to the embodiment.
Figure 6:
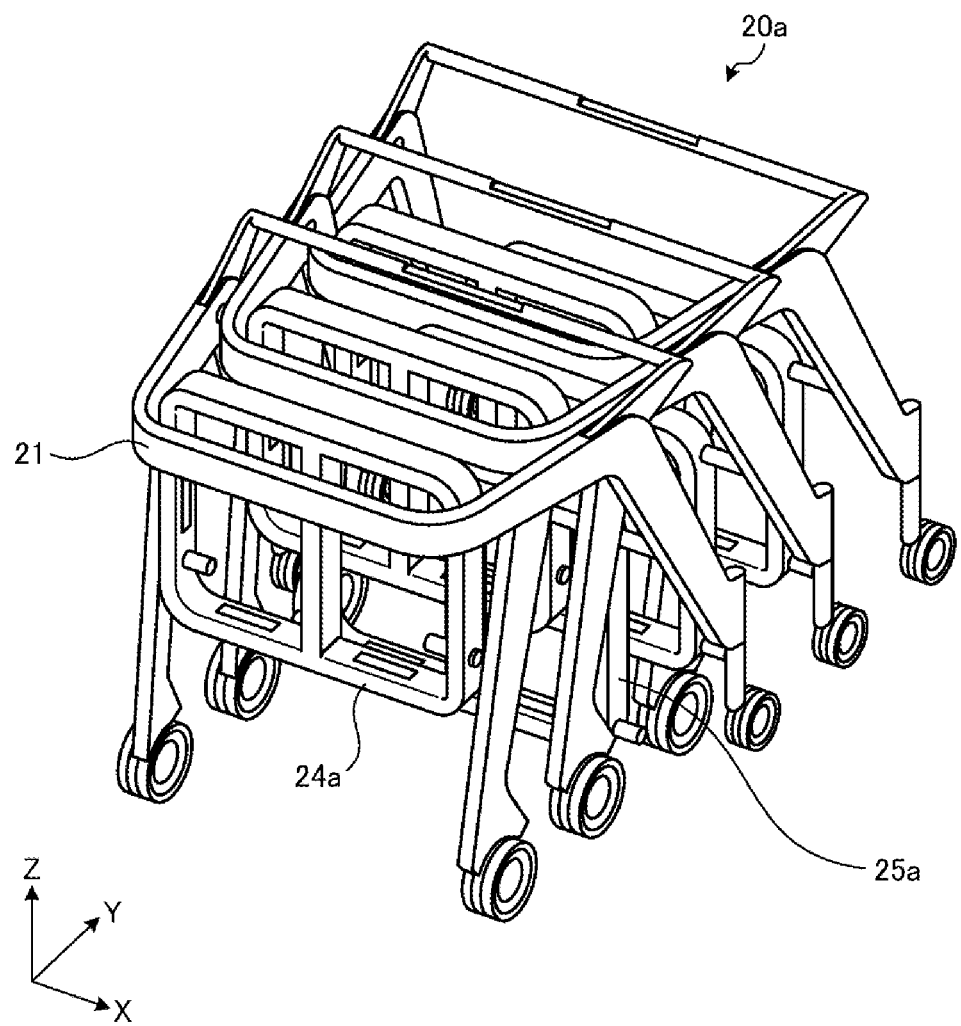
FIG. 6 is an overall perspective view showing an example of the state of stacking a plurality of carts according to the embodiment.

Next, the mounting structure of the container installation frames 24a and 25a will be described with reference to FIGS. 3 to 6. FIG. 3 is an overall perspective view showing an example of the stacking state of the cart. FIG. 4 is a view for describing a rotation mechanism of the upper container installation frame 24a. FIG. 5 is a view for describing a rotation mechanism of the lower container installation frame 25a. FIG. 6 is an overall perspective view showing an example of the state of stacking a plurality of carts.

Since a large number of carts 20a are used in a store, it is desirable that the carts 20a that are not used can be accommodated in as small a region as possible. The cart 20a of this embodiment has a stacking structure in which different carts 20a can be accommodated in a state of overlapping each other.

FIG. 3 shows a state where the cart 20a is to be stacked. At that time, the accommodation portions 31, i.e., the baskets 313 and 314 and the bags 311 and 312, are removed.

As shown in FIG. 3, the left and right ends of the upper container installation frame 24a are axially supported to be rotatable around rotary shafts 90a and 90b provided to the frame 21. The rotary shafts 90a and 90b are provided along a horizontal axis perpendicular to the traveling direction of the cart 20a.

Further, the left and right ends of the lower container installation frame 25a are axially supported to be rotatable around rotary shafts 90c and 90d provided to the frame 21. The rotary shafts 90c and 90d are provided along a horizontal axis perpendicular to the traveling direction of the cart 20a.

Note that, when the cart 20a is in the state of FIG. 3, the container installation frames 24a and 25a are supported by only the rotary shafts 90a, 90b, 90c, and 90d described above and hung vertically downward. So, if an external force in a direction along the Y-axis is applied to the container installation frames 24a and 25a, the container installation frames 24a and 25a swing around the X-axis. Thus, at the time of stacking a plurality of carts 20a, when the container installation frames 24a and 25a of different carts 20a come into contact with each other, the container installation frames 24a and 25a of each cart can cross over the container installation frames 24a and 25a of a different cart. Therefore, the frame 21 of each cart 20a can be caused to slide into the frame 21 of a different cart 20a. As a result, the storage space for the carts 20a can be reduced. The details will be described later (see FIG. 6).

The left and right ends of the handle 22 are axially supported to be rotatable around rotary shafts 90e and 90f provided to the frame 21. The rotary shafts 90e and 90f are provided along a horizontal axis perpendicular to the traveling direction of the cart 20a.

Next, the support structure of the upper container installation frame 24a will be described with reference to FIG. 4.

As shown in the upper part of FIG. 4, the upper container installation frame 24a includes locking bars 91a and 91b. The locking bar 91a is a cylindrical member and is installed to be slidable along the X-axis through the side surface of the container installation frame 24a. The locking bar 91b is a cylindrical member and is installed to be slidable along the X-axis through the side surface of the container installation frame 24a. The locking bars 91a and 91b are examples of a stopper member in this embodiment.

When the accommodation portion 31 is mounted on the upper container installation frame 24a, the container installation frame 24a is rotated around the rotary shafts 90a and 90b so as to be substantially horizontal. As shown in the lower part of FIG. 4, the locking bar 91b is caused to slide to the direction of the arrow Ka, i.e., the X-axis negative side. The locking bar 91b, which is caused to slide, is engaged with an engaging hole 92b provided in the frame 21. Similarly, the locking bar 91a is caused to slide to the X-axis positive side and is engaged with an engagement hole 92a (not shown) provided in the frame 21. In such a manner, the container installation frame 24a is held in a substantially horizontal state.

Note that the locking bars 91a and 91b may be caused to slide manually. Further, an elastic member for biasing the locking bar 91a in the X-axis positive direction may be installed on the locking bar 91a, and an elastic member for biasing the locking bar 91b in the X-axis negative direction may be installed on the locking bar 91b, and when the locking bars 91a and 91b respectively reach the positions of the engagement holes 92a and 92b, they may be spontaneously engaged with the engagement holes 92a and 92b. In other words, when the upper container installation frame 24a is rotated to be substantially horizontal, the distal ends of the locking bars 91a and 91b abutting on the frame 21 are pushed in the directions opposite to the biased directions, and thus slide on the side surfaces of the frame 21. When the distal ends of the locking bars 91a and 91b respectively reach the positions of the engagement holes 92a and 92b, the locking bars 91a and 91b are biased by the elastic members and engaged with the engagement holes 92a and 92b. Note that it is desirable for the distal ends of the locking bars 91a and 91b to be formed in, for example, a hemispherical shape such that the distal ends of the locking bars 91a and 91b abutting on the frame 21 can easily slide on the side surfaces of the frame 21. If the distal ends of the locking bars 91a and 91b are formed in a hemispherical shape, and a force to rotate the container installation frame 24a vertically downward is applied when the lock of the upper container installation frame 24a is to be released, the lock of the locking bars 91a and 91b can be easily released.

Next, the support structure of the lower container installation frame 25a will be described with reference to FIG. 5.

As shown in the upper part of FIG. 5, the lower container installation frame 25a includes locking bars 91c and 91d. The locking bar 91c is a cylindrical member and is installed to be slidable along the X-axis through the side surface of the lower container installation frame 25a. The locking bar 91d is a cylindrical member and is installed to be slidable along the X-axis through the side surface of the container installation frame 25a. The locking bars 91c and 91d are examples of a stopper member in this embodiment.

When the accommodation portion 31 is mounted on the lower container installation frame 25a, the container installation frame 25a is rotated around the rotary shafts 90c and 90d so as to be substantially horizontal. As shown in the lower part of FIG. 5, the locking bar 91d is caused to slide to the direction of the arrow Kb, i.e., the X-axis negative side. The locking bar 91d, which is caused to slide, is engaged with an engaging hole 92d provided in the frame 21. Similarly, the locking bar 91c is caused to slide to the X-axis positive side and is engaged with an engagement hole 92c (not shown) provided in the frame 21. In such a manner, the container installation frame 25a is held in a substantially horizontal state.

Note that the locking bars 91c and 91d may be caused to slide manually. Further, an elastic member for biasing the locking bar 91c in the X-axis positive direction may be installed on the locking bar 91c, and an elastic member for biasing the locking bar 91d in the X-axis negative direction may be installed on the locking bar 91d, and when the locking bars 91c and 91d respectively reach the positions of the engagement holes 92c and 92d, they may be spontaneously engaged with the engagement holes 92c and 92d. In other words, when the lower container installation frame 25a is rotated to be substantially horizontal, the distal ends of the locking bars 91c and 91d abutting on the frame 21 are pushed in the directions opposite to the biased directions, and thus slide on the side surfaces of the frame 21. When the distal ends of the locking bars 91c and 91d respectively reach the positions of the engagement holes 92c and 92d, the locking bars 91c and 91d are biased by the elastic members and engaged with the engagement holes 92c and 92d. Note that it is desirable for the distal ends of the locking bars 91c and 91d to be formed in, for example, a hemispherical shape such that the distal ends of the locking bars 91c and 91d abutting on the frame 21 can easily slide on the side surfaces of the frame 21. If the distal ends of the locking bars 91c and 91d are formed in a hemispherical shape, and a force to rotate the container installation frame 25a vertically downward is applied when the lock of the lower container installation frame 25a is to be released, the lock of the locking bars 91c and 91d can be easily released.

Next, the stacking state of the cart 20a will be described with reference to FIG. 6. As shown in FIG. 6, when the cart 20a is to be stacked, the display device 26 is removed. Subsequently, the container installation frames 24a and 25a are both made hung vertically downward. In such a state, the frame 21 of another cart 20a is caused to slide into the frame 21 of the cart 20a.

At that time, the lower container installation frame 25a hung vertically downward from the frame 21 of a cart 20a comes into contact with the upper container installation frame 24a hung vertically downward from the frame 21 of an entering cart 20a. The upper container installation frame 24a then receives a force toward the Y-axis positive direction from the lower container installation frame 25a being in contact therewith. Thus, the upper container installation frame 24a of the entering cart 20a can cross over the lower container installation frame 25a of the other cart 20a and go to the back of the frame 21 of the other cart 20a.

As a result, as shown in FIG. 6, the plurality of carts 20a can be stacked.

Conversely, when a cart 20a to be used for shopping is taken out from the plurality of carts 20a in the stacked state, the handle 22 of the cart 20a stacked last is gripped and pulled out to the near side. At that time, the upper container installation frame 24a of the cart 20a pulled out comes into contact with the lower container installation frame 25a of a cart 20a stacked adjacently thereto on the far side. The upper container installation frame 24a then receives a force toward the Y-axis negative direction from the lower container installation frame 25a. Thus, the upper container installation frame 24a of the cart 20a pulled out crosses over the lower container installation frame 25a of the cart 20a stacked adjacently thereto on the far side, and thus the pulled-out cart 20a is released from the stacking state.

(Commodity Input Detection Method and Input Commodity Recognition Method)

Figure 7:
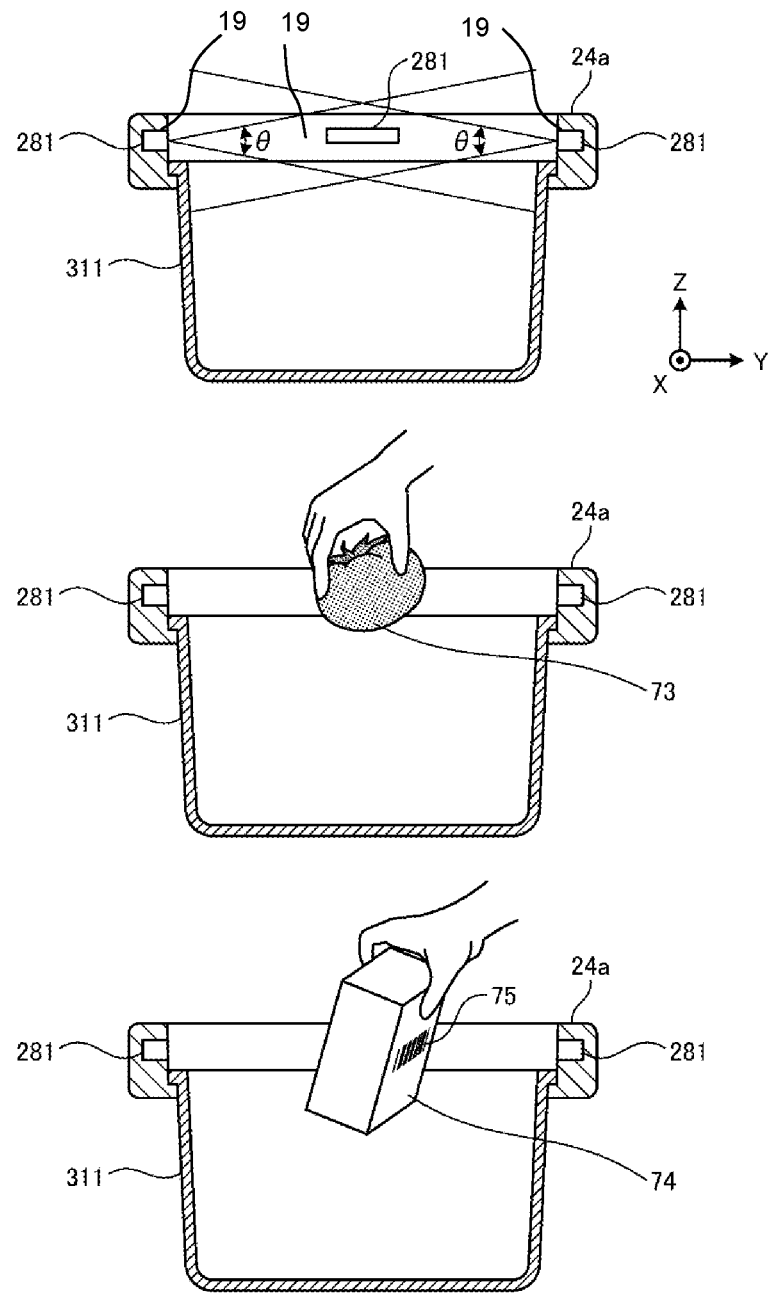
FIG. 7 is a view for describing the function of cameras installed in the cart according to the embodiment.

Next, a method in which the cart 20a detects the input of a commodity and recognizes the input commodity will be described with reference to FIGS. 7 and 8. FIG. 7 is a view for describing the function of the cameras installed in the cart 20a. FIG. 8 is a view for describing a method of detecting the input of a commodity from images captured by the cameras installed in the cart 20a.

The upper part of FIG. 7 is a YZ cross-sectional view showing a state where the bag 311 is mounted on the upper container installation frame 24a of the cart 20a. The cameras 281 described above are respectively installed in the four inner surfaces (inner circumferential surfaces) 19 of the upper container installation frame 24a. FIG. 7 shows only three of the four cameras 281. The cameras 281 at the opposing positions are installed at the same height positions with the observation ranges thereof facing each other. Further, the field of view of each camera 281 has the same viewing angle θ. Note that the illumination LEDs 291 for illuminating at least the range of the viewing angle θ are installed in the vicinity of the cameras 281, though not shown in the figure.

The middle part of FIG. 7 is a view showing an exemplary state where a carrier is putting a perishable food 73 in the bag 311. Each camera 281 captures an image at the same time on the basis of an external synchronization signal output from the cart 20a. Such an imaging operation is constantly continuously executed regardless of whether or not a commodity is put in the bag 311. As a result, four images are captured at the same time. The cart 20a performs commodity input determination processing for determining whether there is a possibility that a commodity has been put in the bag 311 and for identifying the input commodity for each of the four captured images. The commodity input determination processing will be described in detail later (see FIG. 8).

If it is determined by the commodity input determination processing that there is a possibility that a commodity has been put, the cart 20a subsequently performs object recognition. The object recognition in which the commodities appearing the images are recognized is also called generic object recognition. Various recognition technologies used in the generic object recognition are described in detail in the following literatures, and thus descriptions thereof will be omitted.

Keiji Yanai, "The Current State and Future Directions on Generic Object Recognition", Journal of Information Processing Society of Japan, Vol. 48, No. SIG16 [Search on Nov. 18, 2020], the Internet <URL: https://mm.cs.uec.ac.jp/IPSJ-TCVIM-Yanai.pdf>

Jamie Shotton, et al., "Semantic Texton Forests for Image Categorization and Segmentation", [Search on Nov. 18, 2020], the Internet <URL: http://mi.eng.cam.ac.uk/~cipolla/publications/inproceedings/2008-CVPR-semantic-texton-forests.pdf>

Further, in the object recognition, whether or not a code symbol such as a bar code or a two-dimensional code appears in the captured image is recognized. In the object recognition, if the code symbol appears, the code symbol is read.

In the example of the middle part of FIG. 7, the cart 20a detects the input of a commodity and subsequently recognizes that the input commodity is a perishable food 73.

The lower part of FIG. 7 is a view showing an exemplary state where a carrier is putting a commodity 74 with a bar code 75 in the bag 311. In this case as well, the cart 20a performs the same processing as the processing described above. The cart 20a then detects the input of the commodity and subsequently reads the bar code 75 attached to the input commodity. The cart 20a collates the code information recorded in the read bar code 75 with a commodity master 52b (see FIG. 10), and thus recognizes that the input commodity is the commodity 74.

Next, referring to FIG. 8, the method of the commodity input determination processing will be described. The upper part of FIG. 8 shows an exemplary image I(t) captured by the camera 281 at time t. The middle part of FIG. 8 shows an exemplary image I(t+Δt) captured by the camera 281 at Δt seconds later, i.e., at time t+Δt.

The cart 20a performs a difference calculation to subtract the image I(t) from the image I(t+Δt). By the difference calculation, a difference image J(t+Δt) shown in the lower part of FIG. 8 is obtained.

When a commodity is put in the cart 20a, the commodity passes through the observation range of the camera 281. So, in general, the region of the commodity appears in the difference image J(t+Δt). The difference image J(t+Δt) is a so-called gradation image in which the brightness is converted into a pixel value. The cart 20a binarizes the difference image J(t+Δt) with a predetermined threshold, to convert the difference image J(t+Δt) into a binary image. The cart 20a then determines, when the area of the region of the binary image exceeds a predetermined value, that there is a possibility that the brightness of the image has changed greatly during Δt seconds, that is, the commodity has been put in the cart 20a.

If it is determined from the difference image J(t+Δt) that there is a possibility that the commodity has been put in the cart 20a, it is considered that the commodity appears in the image I(t+Δt). So, the cart 20a performs the object recognition on the image I(t+Δt) to recognize the input commodity. Further, if a code symbol such as a bar code is attached to the commodity, the cart 20a reads the code information recorded in the code symbol.

Note that the above description is for describing the processing flow for the image captured by a single camera 281. Actually, the same processing is executed for the four sets of images captured by the four cameras 281. If it is determined, for only one set of images among the four sets of images captured by the four cameras 281, that there is a possibility that a commodity has been put in the cart 20a, the cart 20a performs the object recognition on only the one set of images. On the other hand, if it is determined for a plurality of sets of images that there is a possibility that a commodity has been put in the cart 20a, the cart 20a performs the object recognition on each of the plurality of sets of images. The cart 20a then recognizes the commodity as the input commodity on the basis of, for example, a recognition result of the image from which a recognition result having the highest reliability is output.

(Information Displayed on Display Device of Cart)

Figure 9:
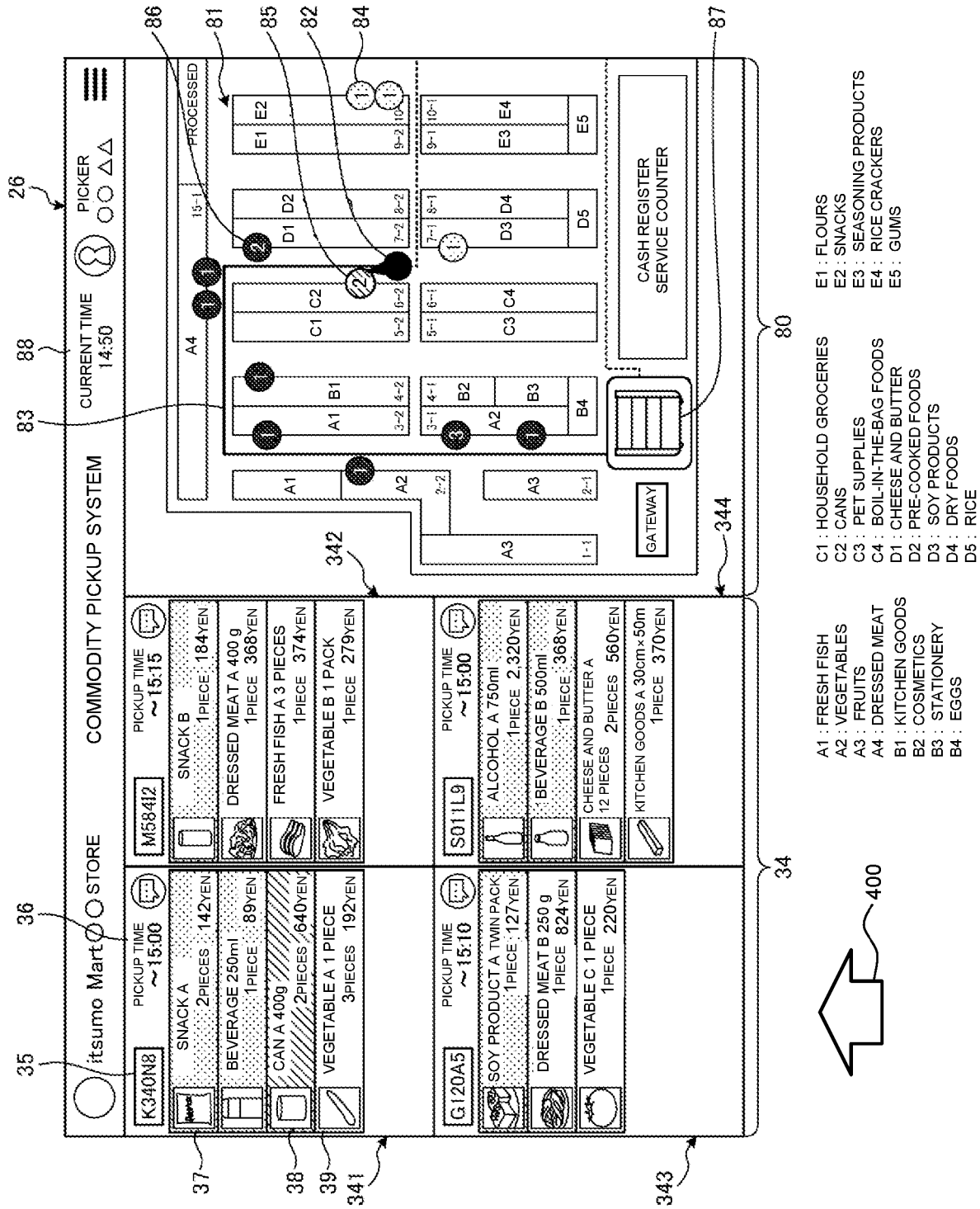
FIG. 9 is a diagram showing an example of information displayed on a display device of the cart according to the embodiment.

Next, the contents of information displayed on the display device 26 of the cart 20a will be described with reference to FIG. 9. FIG. 9 shows an example of information displayed on the display device 26 of the cart 20a.

A commodity list 34 and an in-store map 80 shown in FIG. 9 are displayed on the display device 26 of the cart 20a. The commodity list 34 is a list of commodities to be put in each of the plurality of accommodation portions 31, i.e., the bags 311 and 312 and the baskets 313 and 314.

The commodity list 34 corresponding to each accommodation portion 31 is displayed in a lined-up manner so as to coincide with the arrangement of the accommodation portion 31 when viewed from the carrier gripping the handle 22. Note that, in the following description for FIG. 9, "upper left," "lower left," "upper right," "lower right," and "upper part" are positions in the direction in which the display device 26 is viewed from the direction of the arrow 400 in FIG. 9 (direction viewed from the carrier). More specifically, a commodity list 341 displayed on the upper left is a list of the commodities to be put in the bag 311 located on the upper left or left on the far side when viewed from the carrier gripping the handle 22. A commodity list 342 displayed on the upper right is a list of commodities to be put in the bag 312 located on the upper right or right on the far side when viewed from the carrier gripping the handle 22. A commodity list 343 displayed on the lower left is a list of commodities to be put in the basket 313 located on the lower left or left on the near side when viewed from the carrier gripping the handle 22. A commodity list 344 displayed on the lower right is a list of commodities to be put in the basket 314 located on the lower right or right on the near side when viewed from the carrier gripping the handle 22. As described above, the container installation frame 24a installed on the upper portion of the cart 20a is disposed on the far side when viewed from the carrier, and the container installation frame 25a installed on the lower portion of the cart 20a is disposed on the near side when viewed from the carrier, and thus the arrangement state of the accommodation portions 31 viewed from the carrier's viewpoint is matched with the arrangement state in the commodity list 34. By the correspondence of the arrangement relationship in such a manner, the carrier can easily determine the positions in which the picked-up commodities are to be put.

An order number 35 and a pickup completion target time 36 are displayed in each of the commodity lists 34 (341, 342, 343, and 344). The order number 35 is an order number corresponding to the commodity list. Instead of the order number 35, information for uniquely identifying a customer may be displayed. The pickup completion target time 36 is the target time at which the pickup of the commodities is to be completed. Note that a current time 88 is displayed in the upper part of the display device 26, and thus the carrier picks up the commodities so as not to exceed the pickup completion target time 36 while referring to the pickup completion target time 36 and the current time 88.

Further, the commodities to be picked up are displayed in a lined-up state in the respective commodity lists 34 (341, 342, 343, and 344). The lined-up order is not limited, but in this embodiment, the commodities are lined up and displayed in the pickup order when the cart 20a is moved from the current position thereof along pickup path information 83, which will be described later.

The list 34 (341, 342, 343, and 344) indicating each commodity is displayed in a state where hatching corresponding to the progress state of pickup is added or in a state where coloring corresponding to the progress state of pickup is added. For example, in FIG. 9, the hatched commodity shown by a pickup state 37 indicates that it is the commodity already picked up. The hatched commodity shown by a pickup state 38 indicates that it is the commodity to be picked up next. Further, the hatched commodity shown by a pickup state 39 indicates that it is the commodity that has not yet been picked up.

The in-store map 80 shows the layout of the aisles and commodity shelves in the store. The in-store map 80 further displays a current position 82, the pickup path information 83, and the numbers of commodities 84, 85, and 86.

The current position 82 is an icon indicating the current position and the traveling direction of the cart 20a. Note that the current position and the traveling direction of the cart 20a are detected by the GPS receiver 32 provided in the cart 20a (see FIG. 11).

The pickup path information 83 is information indicating a movement path for efficiently picking up all the commodities ordered and transporting the picked-up commodities to a lash-up shelf 87. In the example shown in FIG. 9, the pickup path information 83 that has already been passed to reach the current position 82 is displayed in a display form changed to the dotted line so as to make the screen easy to see.

The numbers of commodities 84, 85, and 86 are icons each indicating the number of commodities to be picked up at that position. It is desirable that the numbers of commodities 84, 85, and 86 are displayed in accordance with the progress state of pickup. For example, the number of commodities 84 shown in FIG. 9 indicates the position and the number of commodities that have been picked up. The number of commodities 85 indicates the position and the number of commodities to be picked up next. Further, the number of commodities 86 indicates the position and the number of commodities that have not yet been picked up.

(Hardware Configuration of Server Apparatus)

Figure 10:
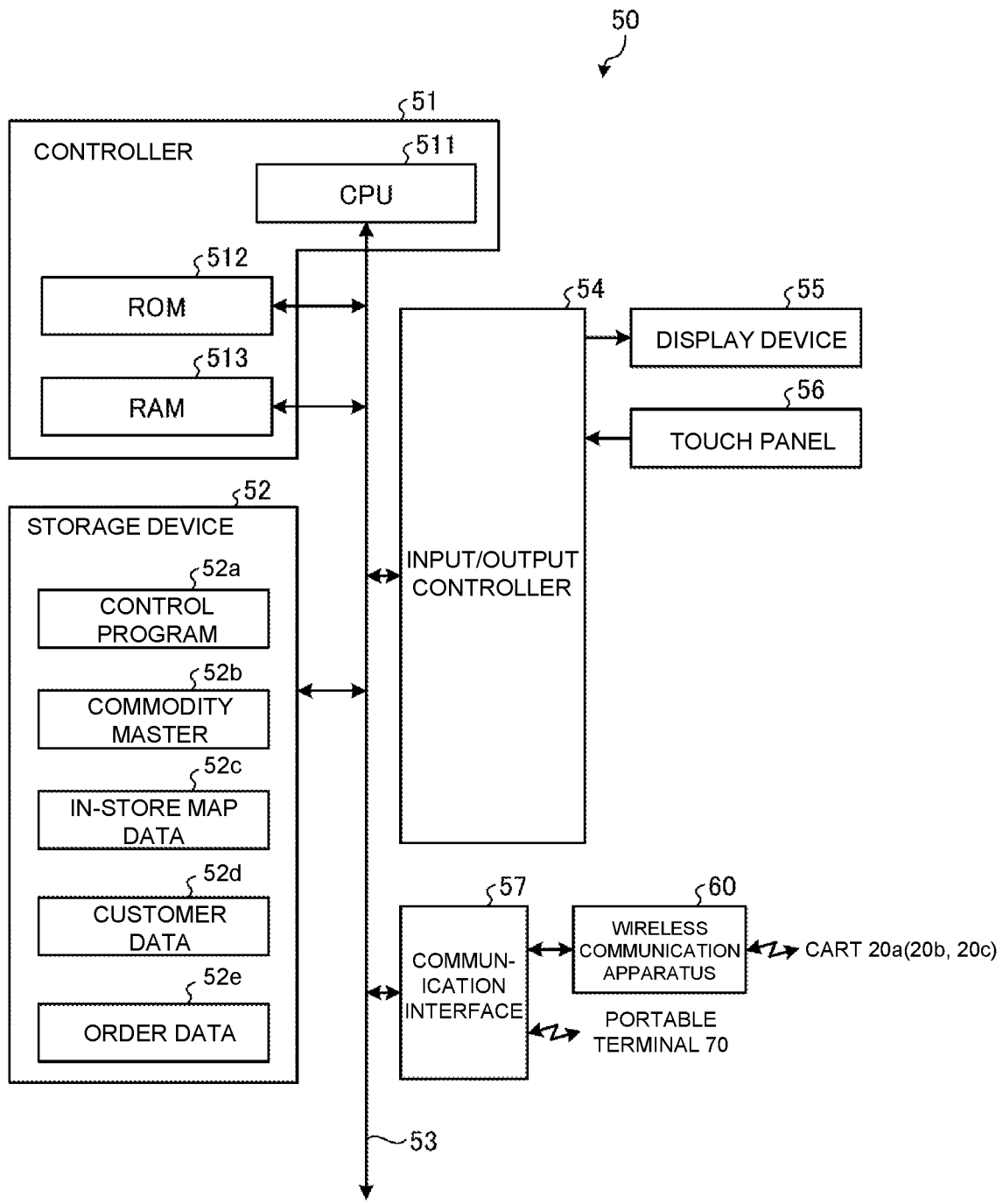
FIG. 10 is a block diagram showing an example of a hardware configuration of a server apparatus according to the embodiment.

Next, a hardware configuration of the server apparatus 50 will be described with reference to FIG. 10. FIG. 10 is a block diagram showing an exemplary hardware configuration of the server apparatus.

The server apparatus 50 includes a controller 51, a storage device 52, an input/output controller 54, and a communication interface 57.

The controller 51 has a general computer configuration including a processor 511, a read only memory (ROM) 512, and a random access memory (RAM) 513. The processor 511 is a central processing unit (CPU), for example. Hereinafter, the processor 511 will be referred to as a CPU 511. The CPU 511 reads various programs, data files, and the like stored in the ROM 512 and the storage device 52 to be described later, and loads them into the RAM 513. The CPU 511 operates according to various programs, data files, and the like loaded into the RAM 513 to manage overall control of the server apparatus 50.

The controller 51 is connected to each of the storage device 52, the input/output controller 54, and the communication interface 57 via an internal bus 53.

The storage device 52 holds the stored information even when the power supply is turned off. The storage device 52 is, for example, a hard disk drive (HDD). Further, the storage device 52 may include a nonvolatile memory such as a flash memory, instead of the HDD. The storage device 52 stores programs and the like including a control program 52a. The control program 52a is a program for allowing the server apparatus 50 to perform its functions.

Note that the control program 52a may be provided by being incorporated in the ROM 512 in advance. Further, the control program 52a may be recorded on a computer readable recording medium such as a CD-ROM, a flexible disk (FD), a CD-R, or a digital versatile disc (DVD) and then provided in the file form installable or executable in the controller 51. In addition, the control program 52a may be stored in a computer connected to a network such as the Internet and to be provided by downloading over a network. Further, the control program 52a may be provided or distributed over a network such as the Internet.

The storage device 52 further stores a commodity master 52b, in-store map data 52c, customer data 52d, and order data 52e.

The commodity master 52b is a master file in which commodity information such as the name, unit price, and the like of a commodity is stored in association with the commodity code. Note that the commodity master 52b is updated at any time in accordance with the commodities to be shipped to the store.

The in-store map data 52c is information including the layout of the store and the layout position of the commodity (shelf allocation data). The layout of the store is so-called map data including the positions and shapes of the aisles in the store. The layout position of the commodity is information in which the coordinate position, at which the commodity is arranged, is associated with the commodity information (for example, commodity code) of the commodity. Although the format of the in-store map data 52c is not limited, for example, a similar format (data in which the aisle is represented by link and node) to that of the road map used in a car navigation system is used.

The customer data 52d is data including an identification number of the customer for identifying the customer and the like, which are registered in advance.

The order data 52e is order information including the identification number of the customer, the name of the commodity to be purchased, and the number of commodities to be purchased. Note that any method of obtaining the order data 52e is used. In other words, the server apparatus 50 may obtain the order data 52e from a customer's smartphone via the Internet 72 or may obtain the order data 52e from a customer's personal computer via the Internet 72. Further, the server apparatus 50 may obtain the order data 52e, which is input by a customer who visits the store while watching a display device 55 of the server apparatus 50 using a touch panel 56.

The input/output controller 54 connects the controller 51, the display device 55 as an input/output device, and the touch panel 56 to each other.

The display device 55 displays various types of information output by the server apparatus 50. The display device 55 is, for example, a liquid crystal display or an organic electroluminescence display.

The touch panel 56 is installed so as to be superimposed on the display surface of the display device 55, and inputs operation information corresponding to a pressing position to the server apparatus 50.

The communication interface 57 transmits and receives various types of information to and from the cart 20a via the wireless communication apparatus 60. Further, the communication interface 57 transmits and receives various types of information to and from the portable terminal 70.

(Hardware Configuration of Cart)

Figure 11:
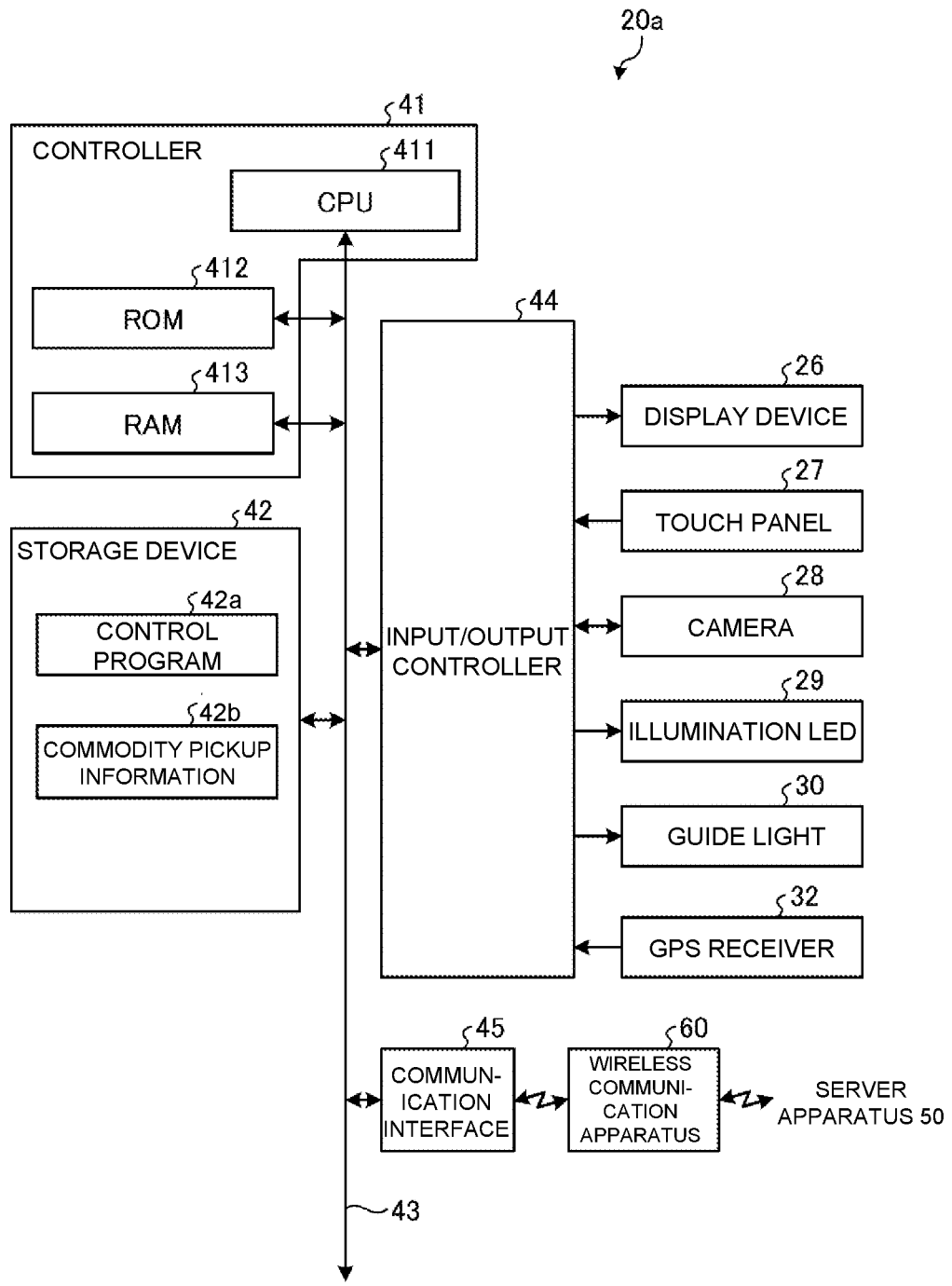
FIG. 11 is a block diagram showing an example of a hardware configuration of the cart according to the embodiment.

Next, a hardware configuration of the cart 20a will be described with reference to FIG. 11. FIG. 11 is a block diagram showing an exemplary hardware configuration of the cart.

The cart 20a includes a controller 41, a storage device 42, an input/output controller 44, and a communication interface 45.

The controller 41 has a general computer configuration including a processor 411, a ROM 412, and a RAM 413. The processor 411 is, for example, a CPU. Hereinafter, the processor 411 will be referred to as a CPU 411. The CPU 411 reads various programs, data files, and the like stored in the ROM 412 and the storage device 42 to be described later, and loads them into the RAM 413. The CPU 411 operates according to various programs, data files, and the like loaded into the RAM 413 to manage overall control of the cart 20a.

The controller 41 is connected to each of the storage device 42, the input/output controller 44, and the communication interface 45 via an internal bus 43.

The storage device 42 holds the stored information even when the power supply is turned off. The storage device 42 is, for example, an HDD. Further, the storage device 42 may include a nonvolatile memory such as a flash memory, instead of the HDD. The storage device 42 stores programs and the like including a control program 42a. The control program 42a is a program for allowing the cart 20a to perform its functions.

Note that the control program 42a may be provided by being incorporated in the ROM 412 in advance. Further, the control program 42a may be recorded on a computer readable recording medium such as a CD-ROM, a flexible disk, a CD-R, or a DVD and then provided in the file form installable or executable in the controller 41. In addition, the control program 42a may be stored in a computer connected to a network such as the Internet and to be provided by downloading over a network. Further, the control program 42a may be provided or distributed over a network such as the Internet.

The storage device 42 further stores commodity pickup information 42b. The commodity pickup information 42b includes the commodity information and the number of commodities to be picked up, which are transmitted from the server apparatus 50. Note that the storage device 42 may store path information (pickup path information 83) indicating a movement path for picking up the commodities, in addition to the commodity pickup information 42b.

The input/output controller 44 connects the controller 41, the display device 26 as an input/output device, the touch panel 27, the camera 28, the illumination LED 29, the guide light 30, and the GPS receiver 32 to each other.

The display device 26 displays various types of information output by the cart 20a (such as the commodity list and in-store map shown in FIG. 9). The display device 26 is, for example, a liquid crystal display or an organic electroluminescence display.

The touch panel 27 is installed so as to be superimposed on the display surface of the display device 26, and inputs operation information corresponding to a pressing position to the cart 20a.

As described above (see FIG. 2), the plurality of cameras 28 are installed in the container installation frames 24a and 25a and capture images of commodities to be put in the accommodation units 31. Note that the camera 28 is a camera using a solid-state imaging device such as a charge coupled device (CCD) or a complementary metal oxide semiconductor (CMOS).

The illumination LED 29 is installed in the vicinity of the camera 28 to illuminate at least the range of the viewing angle θ of the camera 28.

The guide light 30 is an indicator installed in each of the container installation frames 24a and 25a and shows the carrier the input position of a commodity to be picked up next, as described above.

The GPS receiver 32 is a receiver that receives GPS signals. The cart 20a determines its own current position on the basis of the GPS signals received by the GPS receiver 32.

The communication interface 45 transmits and receives various types of information to and from the server apparatus 50 via the wireless communication apparatus 60.

(Functional Configuration of Server Apparatus)

Figure 12:
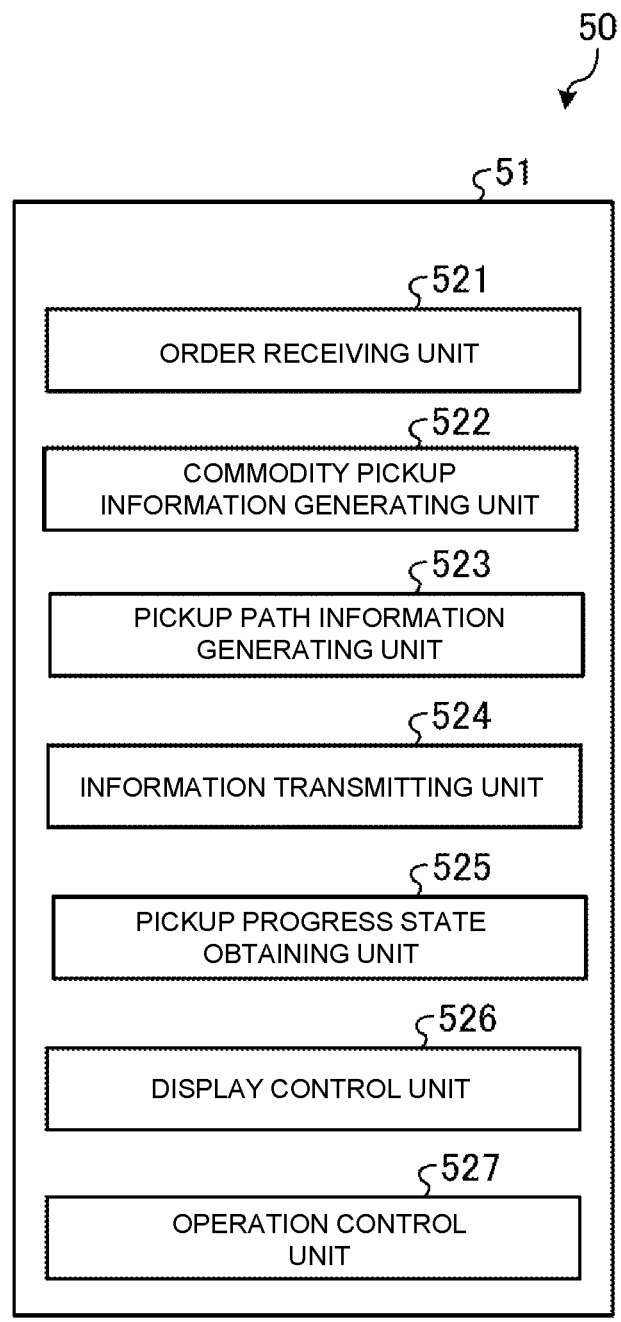
FIG. 12 is a block diagram showing an example of a functional configuration of the server apparatus according to the embodiment.

Next, the functional configuration of the server apparatus 50 will be described with reference to FIG. 12. FIG. 12 is a block diagram showing an exemplary functional configuration of the server apparatus.

The controller 51 of the server apparatus 50 loads the control program 52a to the RAM 513 and operates the control program 52a, to operate as functional units including an order receiving unit 521, a commodity pickup information generating unit 522, a pickup path information generating unit 523, an information transmitting unit 524, a pickup progress state obtaining unit 525, a display control unit 526, and an operation control unit 527 shown in FIG. 12.

The order receiving unit 521 of the controller 51 obtains information of a customer who has ordered the commodities and order information from the portable terminal 70. The order information is information related to the commodities to be picked up and the number of commodities. Note that the order receiving unit 521 may obtain the order information that is input through the operation on the touch panel 56 of the server apparatus 50 by the customer who visits the store.

The commodity pickup information generating unit 522 of the controller 51 generates the commodity pickup information 42b including the commodities to be picked up and the number of commodities on the basis of the order information obtained by the order receiving unit 521.

The pickup path information generating unit 523 of the controller 51 generates the pickup path information 83, with which the cart 20a is moved to pick up the commodities included in the order information without omission (see FIG. 9).

The information transmitting unit 524 of the controller 51 transmits the commodity pickup information 42b generated by the commodity pickup information generating unit 522 and the pickup path information 83 generated by the pickup path information generating unit 523 to the cart 20a. Since a plurality of carts 20a are generally prepared, the information transmitting unit 524 transmits, to a cart 20a, an identification number that uniquely identifies the cart 20a, the commodity pickup information 42b, and the pickup path information 83. Further, the information transmitting unit 524 transmits the information indicating that all the commodities have been picked up to the server apparatus 50.

The pickup progress state obtaining unit 525 of the controller 51 obtains, from the cart 20a, the pickup progress state, i.e., information for identifying the commodities picked up and the commodities not yet picked up among the commodities included in the order information.

The display control unit 526 of the controller 51 causes the display device 55 to display various types of information generated by the server apparatus 50.

The operation control unit 527 of the controller 51 controls the operation of the server apparatus 50 on the basis of the operation information obtained from the touch panel 56.

(Functional Configuration of Cart)

Figure 13:
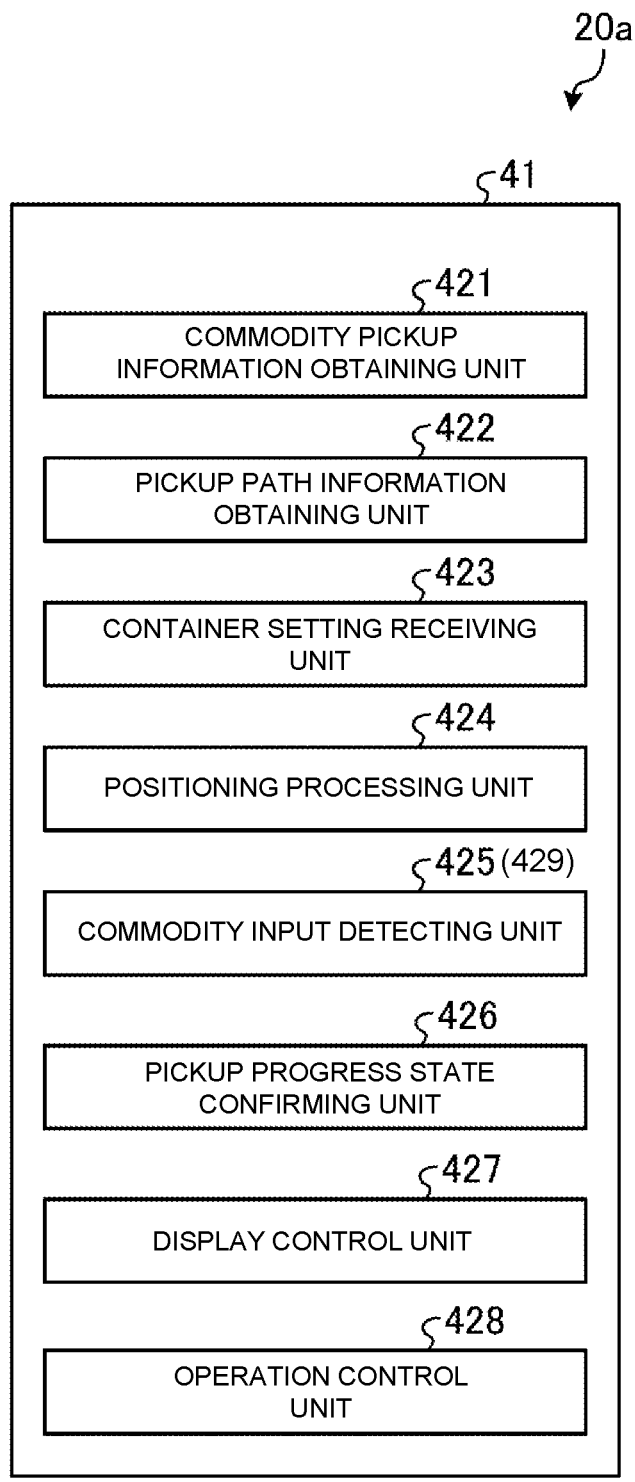
FIG. 13 is a block diagram showing an example of a functional configuration of the cart according to the embodiment.

Next, the functional configuration of the cart 20a will be described with reference to FIG. 13. FIG. 13 is a block diagram showing an exemplary functional configuration of the cart.

The controller 41 of the cart 20a loads the control program 42a to the RAM 413 and operates the control program 42a, to operate as functional units including a commodity pickup information obtaining unit 421, a pickup path information obtaining unit 422, a container setting receiving unit 423, a positioning processing unit 424, a commodity input detecting unit 425, a pickup progress state confirming unit 426, a display control unit 427, and an operation control unit 428 shown in FIG. 13.

The commodity pickup information obtaining unit 421 of the controller 41 obtains, from the server apparatus 50, information of a customer who has ordered the commodities, and information related to the commodities to be picked up and the number of commodities, that is, the commodity pickup information 42b. Note that the commodity pickup information obtaining unit 421 is an exemplary obtaining unit in this embodiment.

The pickup path information obtaining unit 422 of the controller 41 obtains the pickup path information 83 generated by the pickup path information generating unit 523 from the server apparatus 50.

The container setting receiving unit 423 of the controller 41 receives information indicating in which one of the plurality of accommodation portions 31 (bags 311 and 312 and baskets 313 and 314) of the cart 20a the commodity ordered by the customer is to be put. Note that a specific accommodation position (accommodation portion 31) is set by the carrier who carries the cart 20a when the carrier performs an operation of indicating the accommodation position (accommodation portion 31) on the touch panel 27 while viewing a pattern (not shown) indicating the layout of the accommodation portion 31 displayed on the display device 26.

The positioning processing unit 424 of the controller 41 determines the current position of the cart 20a.

The commodity input detecting unit 425 of the controller 41 detects the fact that the picked-up commodity has been put in the accommodation portion 31 and the commodity information of the input commodity on the basis of the images captured by imaging the bags 311 and 312 and the baskets 313 and 314 (accommodation portions 31). Note that the commodity input detecting unit 425 is an exemplary first detector in this embodiment.

The pickup progress state confirming unit 426 of the controller 41 confirms to what extent the pickup has been completed by referring to the commodity pickup information 42b and a detection result of the commodity input detecting unit 425.

On the basis of the information obtained by the commodity pickup information obtaining unit 421, the display control unit 427 of the controller 41 causes the display device 26 to display the lists 341, 342, 343, and 344 (see FIG. 9) of the commodities to be put in the respective accommodation portions 31 for each of the accommodation portions 31 in an arrangement state equal to the arrangement state of the plurality of accommodation portions 31 when viewed from the carrier who is the carrier of the cart 20a. More specifically, the display control unit 427 causes the display device 26 to display the commodities picked up, the commodities to be picked up next, and the commodities not yet picked up so as to be identifiable. Further, the display control unit 427 causes the display device 26 to display the pickup path information 83 and the information indicating the position of the commodity to be picked up. Furthermore, the display control unit 427 controls the turning on and off of the guide light 30. Note that the display control unit 427 is an exemplary display unit in this embodiment.

The operation control unit 428 of the controller 41 controls the operation of the cart 20a on the basis of the operation information obtained from the touch panel 27.

(Processing Performed by Commodity Pickup System)

Figure 14:
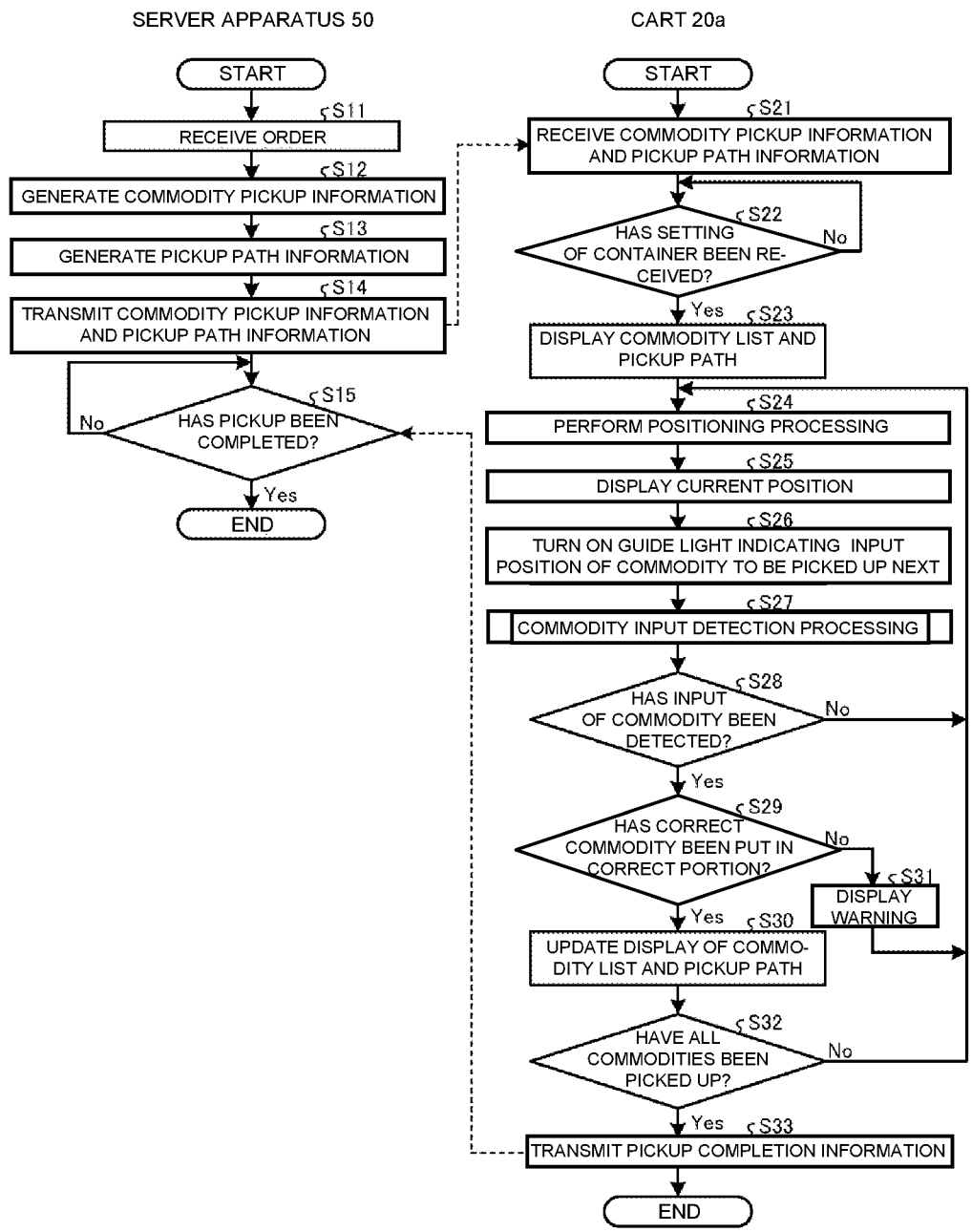
FIG. 14 is a flowchart showing an example of processing performed by a commodity pickup system according to a first embodiment.

Next, the flow of the processing performed by the commodity pickup system 10 will be described with reference to FIG. 14. FIG. 14 is a flowchart showing exemplary processing performed by the commodity pickup system of the first embodiment.

(Processing Performed by Server Apparatus)

First, the flow of the processing performed by the server apparatus 50 will be described. In Step S11 shown in FIG. 14, the order receiving unit 521 of the controller 51 receives an order of the customer, that is, the order data 52e including the identification number of the customer, the name of a commodity to be purchased, and the number of commodities from the portable terminal 70.

In Step S12, the commodity pickup information generating unit 522 of the controller 51 generates the commodity pickup information 42b.

In Step S13, the pickup path information generating unit 523 of the controller 51 generates the pickup path information 83 indicating the movement path for picking up the commodities.

In Step S14, the information transmitting unit 524 of the controller 51 transmits the commodity pickup information 42b and the pickup path information 83 to the cart 20a.

In Step S15, the pickup progress state obtaining unit 525 of the controller 51 determines whether the pickup of all the commodities has been completed. If it is determined that the pickup of all the commodities has been completed (Step S15: Yes), the controller 51 of the server apparatus 50 terminates the processing of FIG. 14. On the other hand, if it is not determined that the pickup of all the commodities has been completed (Step S15: No), the processing of the controller 51 repeats the determination of Step S15.

(Processing Performed by Cart)

Next, the flow of the processing performed by the cart 20a will be described. In Step S21 shown in FIG. 14, the commodity pickup information obtaining unit 421 of the controller 41 obtains the commodity pickup information 42b from the server apparatus 50. Further, in Step S21, the pickup path information obtaining unit 422 of the controller obtains the pickup path information 83 from the server apparatus 50.

In Step S22, the container setting receiving unit 423 of the controller 41 determines whether the setting of the accommodation position has been received. In other words, the accommodation position is the accommodation portion 31 in which the commodity ordered by the customer is to be put. As described above, the accommodation position is set by the carrier who carries the cart 20a when the carrier performs an operation of indicating the accommodation position (accommodation portion 31) on the touch panel 27 while viewing a pattern (not shown) indicating the layout of the accommodation portion 31 displayed on the display device 26. If it is determined that the setting of the accommodation position (accommodation portion 31) has been received (Step S22: Yes), the processing of the controller 41 proceeds to Step S23. On the other hand, if it is not determined that the setting of the accommodation position (accommodation portion 31) has been received (Step S22: No), the processing of the controller 41 repeats the determination of Step S22.

If it is determined that the setting of the accommodation position (accommodation portion 31) has been received (Step S22: Yes), in Step S23, the display control unit 427 of the controller 41 causes the display device 26 to display the lists 34 (341, 342, 343, and 344) of commodities to be picked up on the basis of the received setting (of the accommodation portion 31). Further, in Step S23, the display control unit 427 of the controller 41 causes the display device 26 to display the pickup path information 83 together with the commodity lists 34 (341, 342, 343, and 344).

In Step S24, the positioning processing unit 424 of the controller 41 determines the current position of the cart 20a.

In Step S25, the display control unit 427 of the controller 41 causes the display device 26 to display the current position of the cart 20a.

In Step S26, the display control unit 427 turns on the guide light 30 indicating the input position of a commodity to be picked up next.

In Step S27, the commodity input detecting unit 425 of the controller 41 performs commodity input detection processing for determining in which of the accommodation portions 31 (the bags 311 and 312 and the baskets 313 and 314) the commodity has been put and for identifying the input commodity. Note that the detailed flow of the commodity input detection processing will be described later (see FIG. 15).

In Step S28, the commodity input detecting unit 425 determines whether the input of a commodity has been detected. If it is determined that the input of the commodity has been detected (Step S28: Yes), the processing of the controller 41 proceeds to Step S29. On the other hand, if it is not determined that the input of the commodity has been detected (Step S28: No), the processing of the controller 41 returns to Step S24.

If it is determined that the input of the commodity has been detected (Step S28: Yes), in Step S29, the commodity input detecting unit 425 determines whether the correct commodity has been put in the correct accommodation portion 31. If it is determined that the correct commodity has been put in the correct accommodation portion 31 (Step S29: Yes), the processing of the controller 41 proceeds to Step S30. On the other hand, if it is not determined that the correct commodity has been put in the correct accommodation portion 31 (Step S29: No), the processing of the controller 41 proceeds to Step S31.

If it is determined that the correct commodity has been put in the correct accommodation portion 31 (Step S29: Yes), in Step S30, the display control unit 427 of the controller updates the commodity list 34 and the pickup path information 83, which are displayed on the display device 26.

In Step S32, the pickup progress state confirming unit 426 of the controller 41 confirms whether all the commodities have been picked up. If it is confirmed that all the commodities have been picked up (Step S32: Yes), the processing of the controller 41 proceeds to Step S33. On the other hand, if it is not confirmed that all the commodities have been picked up (Step S32: No), the processing of the controller 41 returns to Step S24 and repeats the processing described above.

If it is confirmed that all the commodities have been picked up (Step S32: Yes), in Step S33, the pickup progress state confirming unit 426 transmits information indicating that the pickup of all the commodities has been completed to the server apparatus 50. Subsequently, the controller 41 of the cart 20*a* terminates the processing of FIG. 14.

On the other hand, if it is not determined that the correct commodity has been put in the correct accommodation portion 31 (Step S29: No), in Step S31, the display control unit 427 of the controller 41 displays, on the display device 26, a warning for prompting confirmation of the input position of the commodity and the input commodity. Subsequently, the processing of the controller 41 returns to Step S24.

(Commodity Input Detection Processing)

Figure 15:
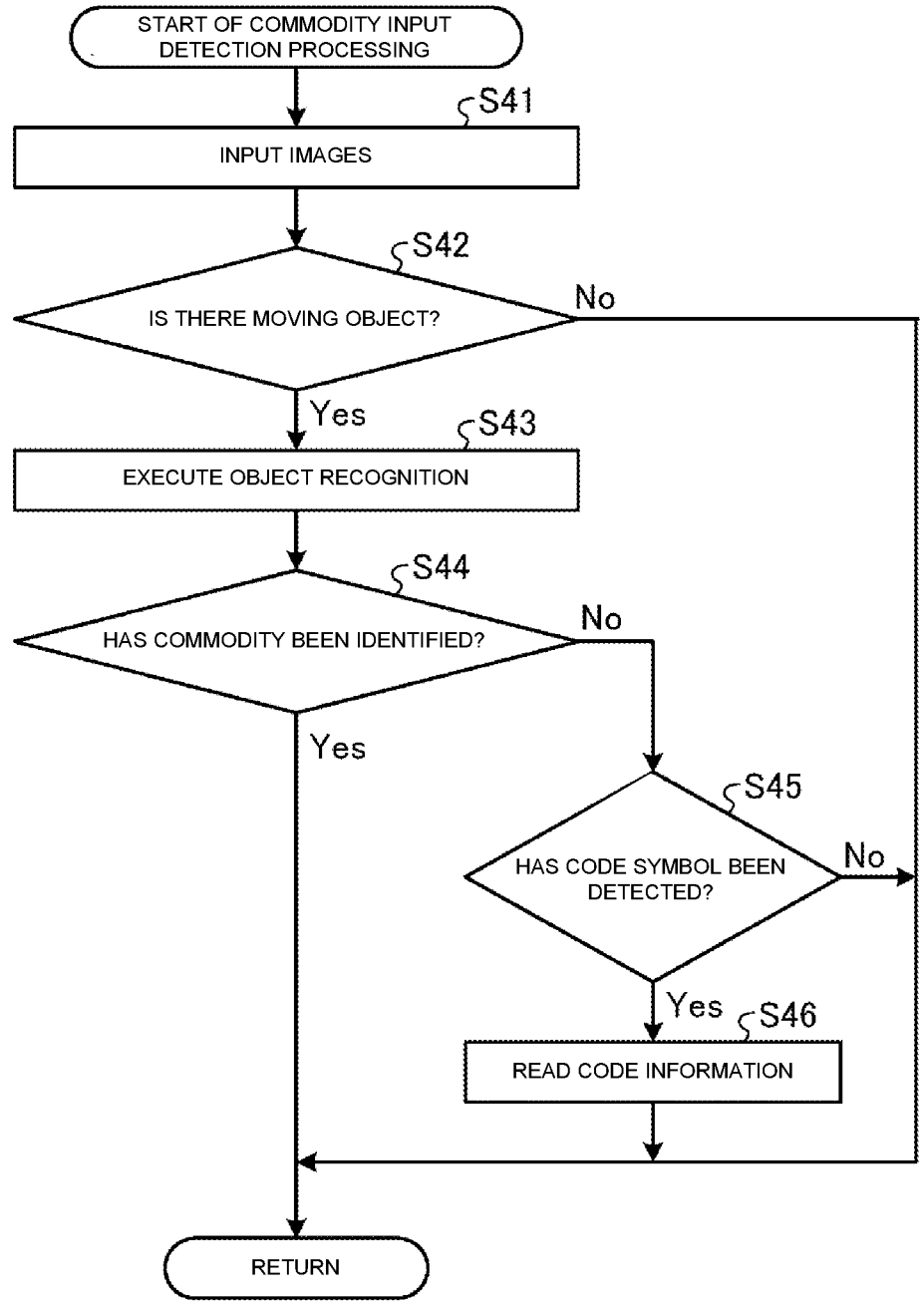
FIG. 15 is a flowchart showing an example of processing performed by a commodity input detecting unit of a cart according to the first embodiment.

Next, the flow of the commodity input detection processing performed in Step S27 of FIG. 14 will be described with reference to FIG. 15. FIG. 15 is a flowchart showing exemplary processing performed by the commodity input detecting unit of the controller 41 of the cart 20*a*.

In Step S41 shown in FIG. 15, the commodity input detecting unit 425 of the controller 41 causes the cameras 28 to capture the images.

In Step S42, the commodity input detecting unit 425 determines whether there is a moving object in the images captured by the cameras 28. If it is determined that there is a moving object in the images captured by the cameras 28 (Step S42: Yes), the processing of the controller 41 proceeds to Step S43. On the other hand, if it is not determined that there is a moving object in the images captured by the cameras 28 (Step S42: No), the processing of the controller 41 returns to the main routine (the flowchart of FIG. 14).

If it is determined that there is a moving object in the images captured by the cameras 28 (Step S42: Yes), in Step S43, the commodity input detecting unit 425 performs the object recognition processing on the image I(t+Δt).

Subsequently, in Step 44, the commodity input detecting unit 425 determines whether the commodity has been identified. If it is determined that the commodity has been identified (Step S44: Yes), the processing of the controller 41 returns to the main routine. On the other hand, if it is not determined that the commodity has been identified (Step S44: No), the processing of the controller 41 proceeds to Step S45.

If it is not determined that the commodity has been identified (Step S44: No), in Step S45, the commodity input detecting unit 425 determines whether a code symbol has been detected from the image I(t+Δt). If it is determined that a code symbol has been detected from the image I(t+Δt) (Step S45: Yes), the processing of the controller 41 proceeds to Step S46. On the other hand, if it is not determined that a code symbol has been detected from the image I(t+Δt) (Step S45: No), the processing of the controller 41 returns to the main routine.

If it is determined that a code symbol has been detected from the image I(t+Δt) (Step S45: Yes), in Step S46, the commodity input detecting unit 425 reads the code information recorded in the detected code symbol. Subsequently, the processing of the controller 41 returns to the main routine.

As described above, in the cart 20*a* (commodity pickup apparatus) of the first embodiment, the commodity pickup information obtaining unit 421 (obtaining unit) of the controller 41 obtains information related to the commodity to be picked up and the number of commodities. On the basis of the information obtained by the commodity pickup information obtaining unit 421, the display control unit 427 (display unit) of the controller 41 causes the display device 26 to display the lists 34 of the commodities to be put in the respective accommodation portions 31 for each of the accommodation portions 31 in an arrangement state equal to the arrangement state of the plurality of accommodation portions 31 when viewed from the carrier of the cart 20*a*. Therefore, it is possible for the carrier to easily recognize the input position of the picked-up commodity and possible to prevent the carrier from putting the commodity in an erroneous accommodation portion 31 when there are a plurality of accommodation portions 31.

Further, the cart 20*a* of the first embodiment includes the frame 21 (support member) whose width Wa on the far side is formed narrower than the width Wb thereof on the near side when viewed from the carrier who grips the handle 22 of the cart 20*a* (see FIG. 3). The frame 21 supports the plurality of casters (leg portions) 23. Further, the cart 20*a* includes the container installation frames 24*a* and 25*a* (first frame member) vertically installed, on which the plurality of accommodation portions 31 are detachably mounted. The left and right ends of the container installation frames 24*a* and 25*a* are axially supported by the frame 21 so as to be rotatable around the horizontal axes 90*a*, 90*b*, 90*c*, and 90*d* perpendicular to the traveling direction of the cart 20*a*. Furthermore, the cart 20*a* includes the locking bars 91*a* 91*b*, 91*c*, and 91*d* (stopper member) for holding the rotational positions of the container installation frames 24*a* and 25*a* in a state where the accommodation portions 31 are mounted on the container installation frames 24*a* and 25*a* (e.g., see FIG. 4). Therefore, when the accommodation portions 31 are removed, the container installation frames 24*a* and 25*a* (first frame member) can be hung vertically downward. Thus, when a plurality of carts 20*a* are stacked (see FIG. 6), the storage space can be reduced.

Further, in the cart 20*a* of the first embodiment, the container installation frames 24*a* and 25*a* are held substantially in parallel by the locking bars 91*a*, 91*b*, 91*c*, and 91*d* in a state where the accommodating portions 31 are mounted. In such a holding state, the lower container installation frame 25*a* is disposed on the side of the carrier who carries the cart 20*a* while gripping the handle 22 (near side). Further, in such a holding state, the upper container installation frame 24*a* is disposed on the far side from the carrier. Therefore, it is possible to match the arrangement state of the accommodation portions 31 when viewed from the viewpoint of the carrier of the cart 20*a* with the arrangement state in the commodity list 34 displayed on the display device 26.

Further, the cart 20*a* of the first embodiment includes the plurality of cameras 28 (first imaging device). The plurality of cameras 28 are provided on the four inner surfaces (inner circumferential surfaces) 19 of the container installation frames 24*a* and 25*a* so as to face the inside of the container installation frames 24*a* and 25*a*. In other words, the plurality of cameras 28 are provided at the outer edge portions of the respective accommodation portions 31 mounted on the container installation frames 24*a* and 25*a* so as to face the inside of the accommodation portions 31. The controller 41 of the cart 20*a* operates as the commodity input detecting unit 425 (first detector) that detects the fact that the picked-up commodity has been put in the correct accommodation portion 31, and a feature amount for identifying the commodity or the code symbol attached to the commodity, from the images captured by the plurality of cameras 28. Therefore, the cart 20*a* can reliably and easily recognize whether or not the picked-up commodity has been put in the correct position and also reliably identify the input commodity.

Modification of First Embodiment

Figure 16:
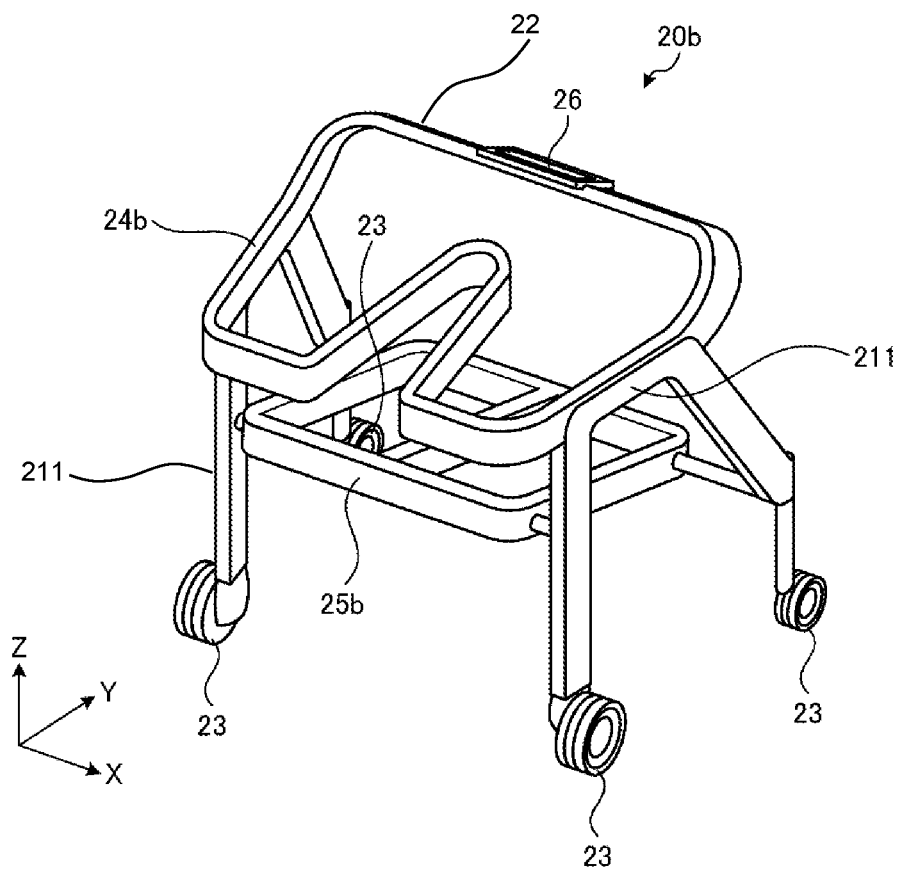
FIG. 16 is a perspective view showing an example of an appearance of a cart of a commodity pickup system according to a modification of the first embodiment.
Figure 17:
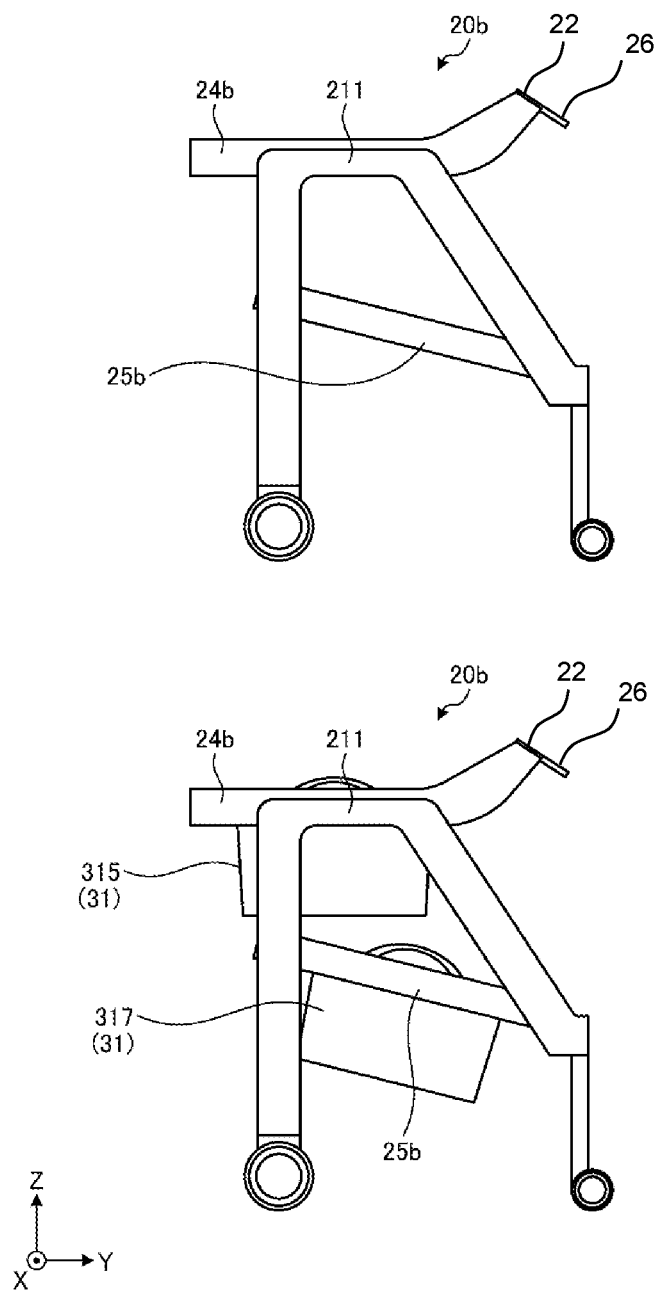
FIG. 17 is a side view showing an example of the cart of the commodity pickup system according to the modification of the first embodiment.
Figure 18:
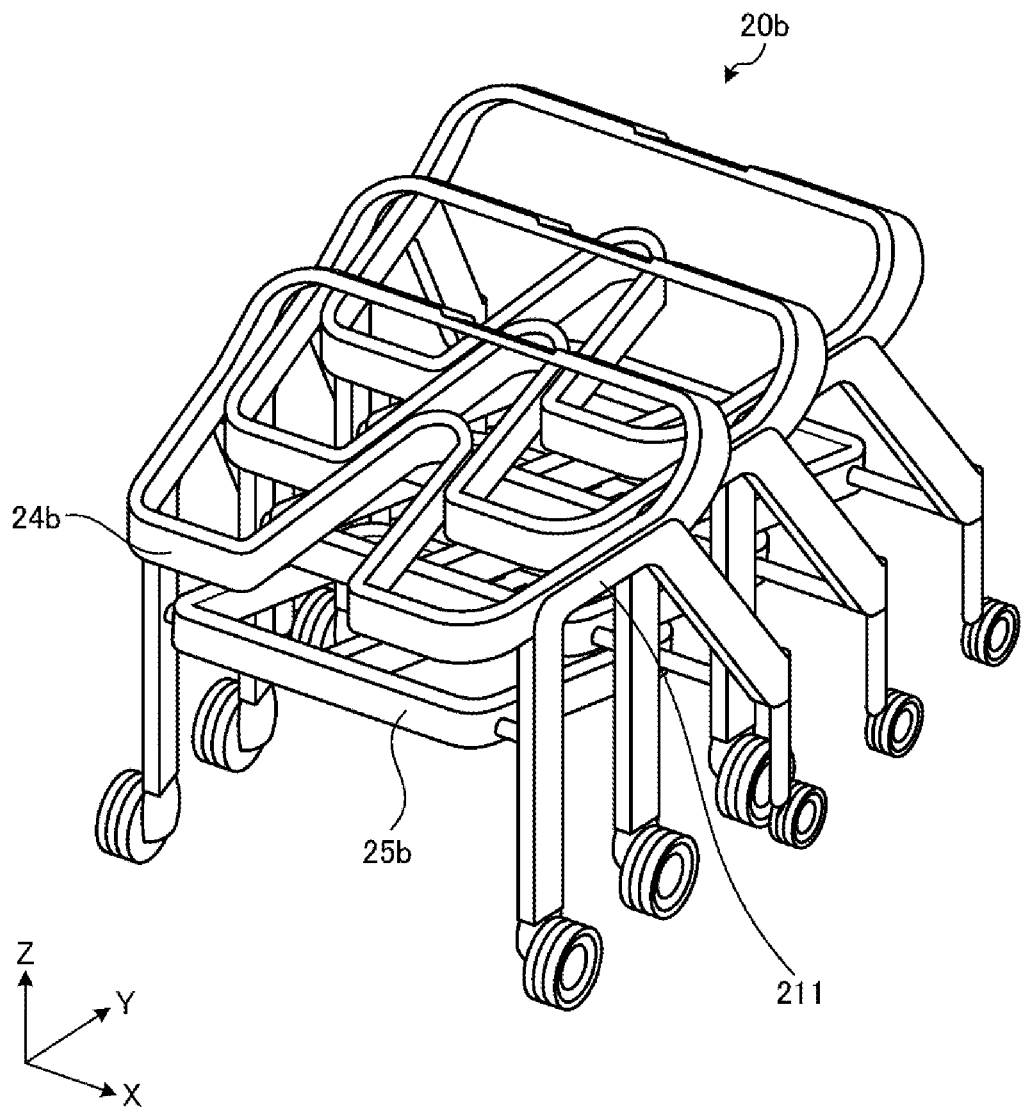
FIG. 18 is an overall perspective view showing an example of the state of stacking a plurality of carts according to the modification of the first embodiment.

Next, a cart 20*b* as a modification of the cart 20*a* described in the first embodiment will be described with reference to FIGS. 16 to 18. FIG. 16 is a perspective view showing an example of an appearance of a cart 20b of a commodity pickup system according to a modification of the first embodiment. FIG. 17 is a side view showing an example of the cart 20b of the commodity pickup system according to the modification of the first embodiment. FIG. 18 is an overall perspective view showing an example of a state where a plurality of carts 20b according to the modification of the first embodiment are stacked. Note that the hardware configuration and the functional configuration of the cart 20b are the same as those of the cart 20a.

As shown in FIG. 16, the cart 20b including a frame 211 as the main constituent member includes four casters 23 on the frame 211. Note that the cart 20a includes the handle 22 separated from the container installation frame 24a, whereas the cart 20b includes a handle 22 integrated into a container installation frame 24b to be described later. Note that, similarly to the cart 20a, the width Wa of the frame 211 on the far side (length in the X-axis direction) is formed narrower than the width Wb thereof on the carrier side, i.e., the near side (length in the X-axis direction). The distance between the two casters 23 on the far side when viewed from the carrier who grips the handle 22 is narrower than the distance between the two casters 23 on the near side. Note that the frame 211 is an example of a support member in this embodiment.

As shown in FIG. 16, the container installation frame 24b is installed on the upper portion of the frame 211. The container installation frame 24b is fixed to the frame 211, and the near side also serves as the handle 22. A display device 26 is detachably attached to the handle 22. The container installation frame 24b is substantially horizontally installed on the frame 211, and a plurality of accommodation portions 31 are detachably mounted thereon. Note that the width of the container installation frame 24b in the X-axis direction is formed narrower toward the far side of the frame 211. The mounting structure of the container installation frame 24b will be described later in detail (see FIG. 17). Note that the container installation frame 24b is an example of a second frame member in this embodiment.

A container installation frame 25b is installed on the lower portion of the frame 211. The container installation frame 25b is installed on the carrier's side of the cart 20b relative to the upper container installation frame 24b (see, for example, FIG. 17). Further, the container installation frame 25b is installed higher (Z-axis positive side) toward the far side when viewed from the carrier who grips the handle 22 of the cart 20b, and a plurality of accommodation portions 31 are detachably mounted thereon from the carrier's side. The mounting structure of the container installation frame 25b will be described later in detail (see FIG. 17). Note that the container installation frame 25b is an example of a third frame member in this embodiment.

FIG. 17 is a side view of the cart 20b when viewed from the X-axis positive side. The side view of the upper part of FIG. 17 shows a state where the accommodation portions 31 are not mounted, and the side view of the lower part of FIG. 17 shows a state where the accommodation portions 31 are mounted.

As shown in FIG. 17, the upper container installation frame 24b is installed on the frame 211 in a substantially horizontal state. Note that the near side of the container installation frame 24b serves as the handle 22 as described above. The side serving as the handle is curved upward (Z-axis positive direction) such that the carrier of the cart 20b can easily grip the handle. For example, a bag 315, which is an example of the accommodation portion 31, is detachably mounted on the container installation frame 24b. Although not shown in FIG. 17, two accommodation portions 31 can be mounted on the container installation frame 24b.

The lower container installation frame 25b is installed below the container installation frame 24b. Further, the container installation frame 25b is installed higher (Z-axis positive side) toward the far side when viewed from the carrier who grips the handle 22 of the cart 20b, i.e., is installed obliquely when viewed from the lateral side. For example, a bag 317, which is an example of the accommodation portion 31, is detachably mounted on the container installation frame 25b. Although not shown in FIG. 17, two accommodation portions 31 can be mounted on the container installation frame 25b.

Further, as shown in FIG. 17, the lower container installation frame 25b is installed on the carrier's side of the cart 20b relative to the upper container installation frame 24b. Thus, the carrier can visually recognize, from the carrier's viewpoint, the upper surface of the accommodation portion 31 mounted on the container installation frame 24b, and the upper surface of the accommodation portion 31 mounted on the container installation frame 25b. As a result, since the commodity list 34 displayed on the display device 26 (see FIG. 9) and the arrangement state of the accommodation portions 31 can be matched with each other, the carrier can easily put the picked-up commodity in a correct accommodation portion 31.

Next, the stacking state of the cart 20b will be described with reference to FIG. 18. As shown in FIG. 18, when the cart 20b is to be stacked, the display device 26 is removed. The frame 211 of another cart 20b is then caused to enter the inside of the frame 211 of the cart 20b.

At that time, the width of the container installation frame 24b is narrower toward the far side when viewed from the carrier who grips the handle 22, and the container installation frame 25b is installed lower toward the carrier's side, i.e., on the near side. The entering cart 20b slides into the frame 211 of the other cart 20b without interference. In such a manner, the plurality of carts 20b can be stacked.

Conversely, when a cart 20b to be used for shopping is taken out from the plurality of carts 20b in the stacked state, the cart 20b stacked last is pulled out to the near side. At that time, the pulled-out cart 20b is released from the stacking state without interfering with the other carts 20b.

As described above, the cart 20b (commodity pickup apparatus) of the modification of the first embodiment includes the frame 211 (support member) whose width on the far side when viewed from the carrier who grips the handle 22 of the cart 20b is formed narrower than the width thereof on the near side. The frame 211 supports the plurality of casters (leg portions) 23. Further, the cart 20b includes the container installation frame 24b (second frame member) that is disposed substantially horizontally on the frame 211 and detachably mounts the plurality of accommodation portions 31. Furthermore, the cart 20b includes the container installation frame 25b (third frame member) below the container installation frame 24b and on the near side of the cart 20b (on the side of the carrier who grips the handle 22) relative to the container installation frame 24b. The container installation frame 25b is installed higher toward the far side of the cart 20b and detachably mounts the plurality of accommodation portions 31. Therefore, in the cart 20b, it is possible to prevent interference when the plurality of carts 20b are stacked without having a rotation function of the container installation frames 24b and 25b. Further, the arrangement state of the accommodation portions 31 when viewed from the carrier's viewpoint of the cart 20b is matched with the arrangement state in the commodity list 34 displayed on the display device 26. This can prevent the carrier from putting a commodity in an erroneous accommodation portion 31 when there are a plurality of accommodation portions 31.

Second Embodiment

Next, a commodity pickup system as a second embodiment will be described. The commodity pickup system as a second embodiment has the configuration shown in FIG. 1, for example, as in the commodity pickup system of the first embodiment. FIG. 19 is an overall perspective view and a side view showing an example of a cart of the commodity pickup system according to the second embodiment.

(Overall Configuration of Cart)

As shown in FIG. 1, a commodity pickup system 100 according to the second embodiment includes a cart 20c, a server apparatus 50, and a portable terminal 70. The hardware configuration (see FIG. 10) and the functional configuration (see FIG. 12) of the server apparatus 50 are the same as those of the first embodiment. Further, the cart 20c includes an upper camera 62 to be described later in addition to the hardware configuration of the cart 20a (see FIG. 11). Furthermore, the cart 20c includes a commodity input detecting unit 429 (see FIG. 13) in place of the commodity input detecting unit 425 of the cart 20a.

As shown in FIG. 19, the cart 20c including a frame 212 as the main constituent member includes a handle 22 attached to the frame 212 and four casters 23. Note that, similarly to the cart 20a, the width of the frame 212 on the far side when viewed from a carrier who grips the handle 22 of the cart 20c is formed narrower than the width thereof on the near side. The distance between the two casters 23 on the far side is narrower than the distance between the two casters 23 on the near side. Note that the frame 212 is an example of a support member in this embodiment.

A container installation frame 24c is installed on the frame 212. The container installation frame 24c is fixed to the frame 212. As shown in the side view of FIG. 19, the container installation frame 24c is installed higher (Z-axis positive side) toward the far side when viewed from the carrier of the cart 20c, i.e., is installed obliquely when viewed from the lateral side. For example, bags 319, 320, 321, and 322, which are examples of the accommodation portion 31, are detachably mounted on the container installation frame 24c. Note that the container installation frame 24c is an example of a fourth frame member in this embodiment.

A display device 26 is installed on the handle 22. The function of the display device 26 is as described in the first embodiment. In other words, the commodity list 34 and the in-store map 80 are displayed on the display device 26 in the same manner as in FIG. 9.

A plurality of scanner cameras 33 (285, 286, 287, and 288) and a plurality of illumination LEDs 29 (295, 296, 297, and 298) are installed on the four inner surfaces (inner circumferential surfaces) 19 of the container installation frame 24c so as to face the inside of the container installation frame 24c. In other words, the plurality of scanner cameras 33 are provided at the outer edge portions of the respective accommodation portions 31 mounted on the container installation frame 24c so as to face the inside of the accommodation portions 31. The scanner cameras 33 are installed substantially horizontally along the X-axis and Y-axis at equal height positions in the Z-axis direction. The scanner cameras 33 capture images of a region, through which a commodity is expected to pass, from four different directions when the commodity is put in the bag 319, 320, 321, or 322. Note that FIG. 19 does not show the specific installation positions of the illumination LEDs 29 clearly, but the illumination LEDs 29 are installed in the vicinity of the respective scanner cameras 33 to illuminate at least the imaging ranges of the respective scanner cameras 33. The cart 20c obtains images captured by the scanner cameras 33 and recognizes the commodity put in the bag 319, 320, 321, or 322. Note that the scanner camera 33 is an example of a first imaging device in this embodiment.

Further, guide lights 30 (305, 306, 307, and 308) are installed in the container installation frame 24c at positions visible from the carrier who moves the cart 20c. The guide light 30 is an indicator to indicate the input position of a commodity to be picked up next.

A pole 61 extending vertically upward (Z-axis positive direction) is installed on the frame 212. The upper camera 62 is installed at the upper end of the pole 61. The upper camera 62 is installed facing downward to image the entire container installation frame 24c. In other words, the upper camera 62 images the range of a viewing angle ω shown in the side view of FIG. 19. The cart 20c obtains the image captured by the upper camera 62 and identifies the basket in which a commodity is put. Note that the upper camera 62 is an example of a second imaging device in this embodiment.

Note that the container installation frame 24c is installed higher toward the traveling direction side of the cart 20c, i.e., is installed obliquely when viewed from the lateral side as described above, and thus the input position of the commodity coincides with the arrangement in the commodity list 34 from the viewpoint of the carrier of the cart 20c.

Figure 20:
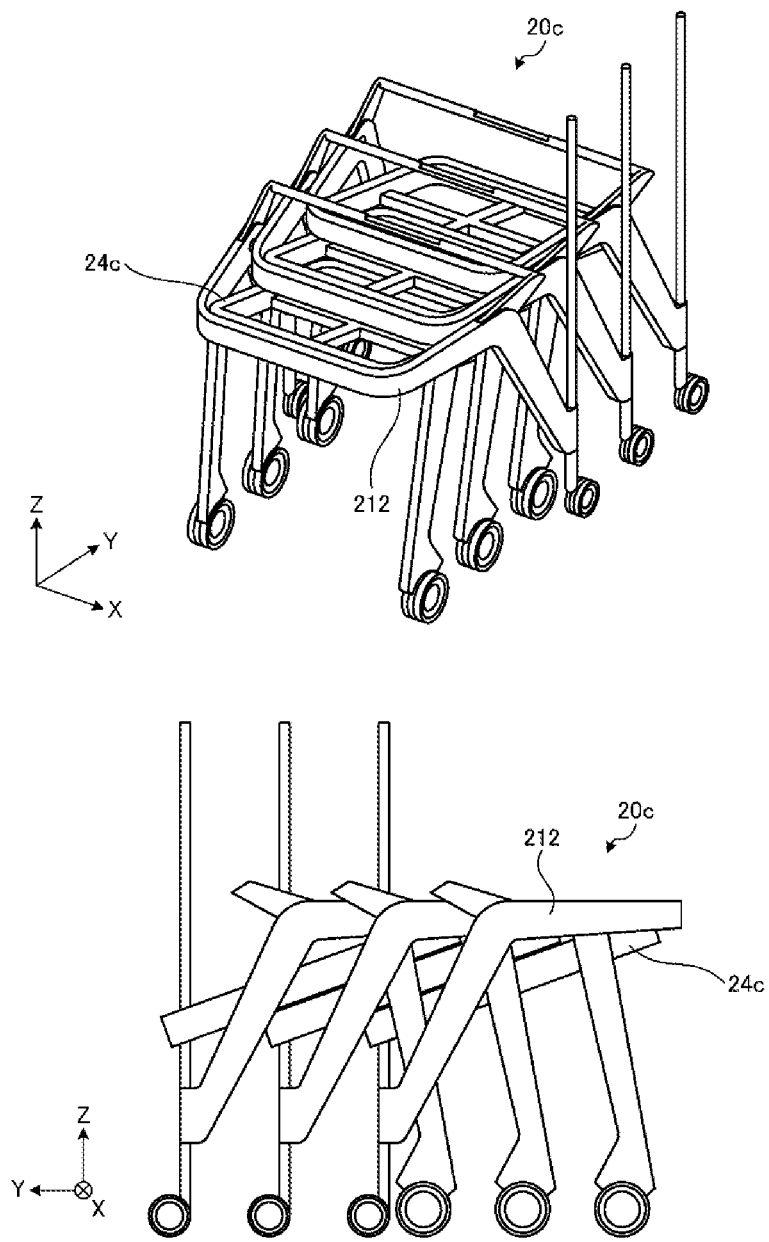
FIG. 20 is an overall perspective view and a side view showing an example of the state of stacking the carts of the commodity pickup system according to the second embodiment.

Next, the stacking state of the cart 20c will be described with reference to FIG. 20. FIG. 20 is an overall perspective view and a side view showing an example of a state where the carts 20c of the commodity pickup system of the second embodiment are stacked.

As shown in FIG. 20, when the cart 20c is stacked, the display device 26 is removed. The frame 212 of another cart 20c is then caused to enter the inside of the frame 212 of the cart 20c.

At that time, the width of the frame 212 is narrower toward the far side, and the container installation frame 24c is installed higher toward the far side. Therefore, the entering cart 20c slides into the frame 212 of the other cart 20c without interference. In such a manner, the plurality of carts 20c can be stacked.

(Commodity Input Detection Method)

Next, a method of detecting the input of a commodity performed by the cart 20c will be described. Note that the detection of the input of a commodity is performed by the commodity input detecting unit 429 of the controller 41 of the cart 20c (see FIG. 13).

The commodity input detecting unit 429 of the controller 41 determines whether the picked-up commodity is put in a correct position of the plurality of accommodation portions 31 from the image captured by the upper camera 62 (second imaging device). As described above, the upper camera 62 is installed at a position capable of capturing an image including all of the openings, through which commodities are put, of the plurality of accommodation portions 31 mounted on the container installation frame 24c (fourth frame member). In addition, the commodity input detecting unit 429 detects a commodity feature amount for identifying the input commodity or a code symbol attached to the commodity from the images captured by the respective scanner cameras 33 (first imaging device). As described above, the scanner cameras 33 are installed to face the inside of the accommodation portions 31 at the outer edge portions 31a of the plurality of accommodation portions 31 mounted on the container installation frame 24c (fourth frame member). Note that the commodity input detecting unit 429 is a second detector in this embodiment.

Figure 21:
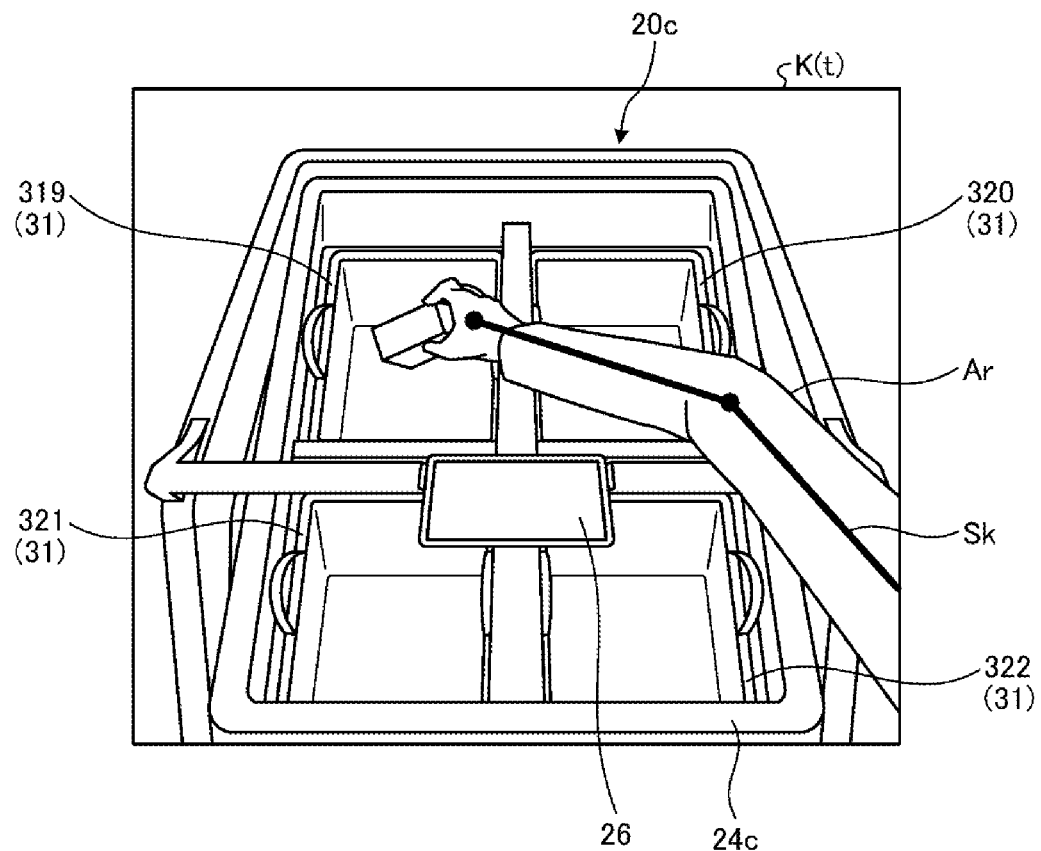
FIG. 21 is a view showing an example of an image captured by an upper camera according to the second embodiment.

With reference to FIG. 21, a specific operation of the commodity input detecting unit 429 will be described. FIG. 21 is a view showing an example of an image captured by the upper camera 62.

FIG. 21 is an example of an image K(t) captured by the upper camera 62 at time t. The image K(t) is an image of the entire container installation frame 24c of the cart 20c captured by the upper camera 62. At that time, when the carrier picks up a commodity and puts the commodity in the bag 319 (accommodation portion 31), an arm Ar of the carrier appears in the image K(t).

Similarly to the commodity input detecting unit 425 described in the first embodiment, the commodity input detecting unit 429 of the cart 20c generates a difference image of two images captured at different times. The commodity input detecting unit 429 then extracts a region in which the change in brightness exceeds a predetermined threshold value. When the area of the extracted region exceeds a predetermined value, the region is highly likely to be the arm of the carrier who is putting the commodity.

The commodity input detecting unit 429 then performs skeleton recognition for fitting the human arm to the extracted region. The skeleton recognition is a known image recognition technique in which motion analysis of a human is performed by fitting a human skeleton model to a captured image. In the case of this embodiment, the commodity input detecting unit 429 extracts a skeleton model Sk of the arm from the region, which is extracted from the difference image and considered to be the arm of the human. The commodity input detecting unit 429 then recognizes at which position of the four accommodation portions 31 the portion corresponding to the arm end of the skeleton model Sk is positioned, and thus detects the position at which the commodity is put.

Note that the commodity input detecting unit 429 may directly extract the arm Ar of the carrier and the skeleton model Sk from the image K(t) without performing the difference calculation of the image K(t). However, if the difference calculation is performed, the reflection of the background is removed, and the calculation load of the image processing can be reduced.

(Input Commodity Recognition Method)

The commodity input detecting unit 429 of the cart 20c further performs object recognition on the images captured by the scanner cameras 33 to recognize the input commodity. The method of recognizing the commodity is the same as the method described in the first embodiment.

Note that the commodity input detecting unit 429 of the cart 20c detects the input position of the commodity from the image captured by the upper camera 62 and recognizes the commodity from the images captured by the scanner cameras 33. So, if the scanner cameras 33 start imaging after the upper camera 62 detects the input position of the commodity, there is a possibility that imaging for the commodity is delayed. Thus, the commodity input detecting unit 429 of the cart 20c causes the scanner cameras 33 to constantly capture images at predetermined time intervals and also stores the predetermined number of latest images. When the upper camera 62 detects the input position of the commodity, the commodity input detecting unit 429 of the cart 20c reads the image in which the detected input position is captured, and recognizes the commodity put in the detected input position.

The method of recognizing the commodity is as described in the first embodiment. Through the recognition processing, the commodity input detecting unit 429 identifies the input commodity. Further, if a code symbol is attached to the commodity, the commodity input detecting unit 429 reads code information recorded in the code symbol.

(Processing Performed by Commodity Pickup System)

Figure 22:
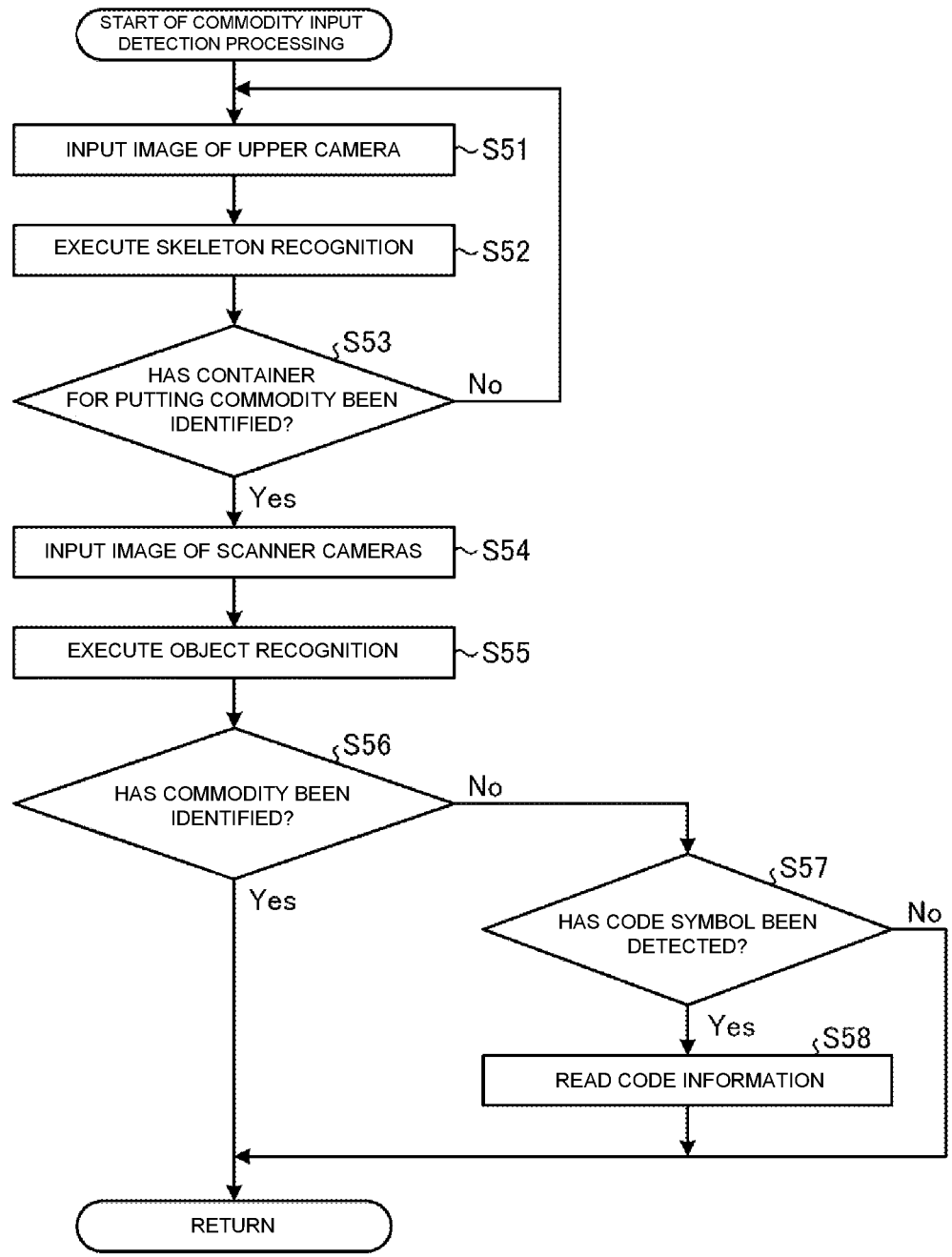
FIG. 22 is a flowchart showing an example of processing performed by a commodity input detecting unit of the cart of the commodity pickup system according to the second embodiment.

Next, the flow of the processing performed by the commodity pickup system 100 will be described. The processing performed by the commodity pickup system 100 is substantially the same as the processing performed by the commodity pickup system 10 described in the first embodiment (see FIG. 14). The difference between the processing performed by the commodity pickup system 100 and the processing performed by the commodity pickup system 10 shown in FIG. 14 is the contents of the commodity input detection processing performed in Step S27 of FIG. 14. Hereinafter, the flow of the processing performed by the commodity input detecting unit 429 of the cart 20c will be described with reference to FIG. 22. FIG. 22 is a flowchart showing an example of the flow of the processing performed by the commodity input detecting unit 429 of the controller 41 of the cart 20c included in the commodity pickup system of the second embodiment.

In Step S51 shown in FIG. 22, the commodity input detecting unit 429 of the controller 41 causes the upper camera 62 to capture an image.

In Step S52, the commodity input detecting unit 429 of the controller 41 performs skeleton recognition and extracts a skeleton model Sk. The commodity input detecting unit 429 then detects the end position of the skeleton model Sk and identifies the input position of the commodity, that is, an accommodation portion 31 among the accommodation portions 319 to 322.

In Step S53, the commodity input detecting unit 429 determines whether the input position of the commodity, that is, an accommodation portion 31 in which the commodity is put is identified. If it is determined that an accommodation portion 31 in which the commodity is put is identified (Step S53: Yes), the processing of the controller 41 proceeds to Step S54. On the other hand, if it is not determined that an accommodation portion 31 in which the commodity is put is identified (Step S53: No), the processing of the controller 41 returns to Step S51.

If it is determined that an accommodation portion 31 in which the commodity is put is identified (Step S53: Yes), in Step S54, the commodity input detecting unit 429 of the controller 41 causes the scanner cameras 33 to capture images. Note that, at this point of time, the commodity input detecting unit 429 may cause the scanner camera 33 close to the input position of the commodity to capture an image. Further, as described above, the commodity input detecting unit 429 may read an image captured by the scanner camera 33 close to the input position of the commodity from among the plurality of images captured by the scanner cameras 33 over the past predetermined time.

Subsequently, in Step S55, the commodity input detecting unit 429 of the controller 41 performs the object recognition processing on the image obtained in Step S54.

Next, in Step S56, the commodity input detecting unit 429 of the controller 41 determines whether the commodity has been identified. If it is determined that the commodity has been identified (Step S56: Yes), the processing of the controller 41 returns to the main routine (FIG. 14). On the other hand, if it is not determined that the commodity has been identified (Step S56: No), the processing of the controller 41 proceeds to Step S57.

If it is not determined that the commodity has been identified (Step S56: No), in Step S57, the commodity input detecting unit 429 of the controller 41 determines whether a code symbol has been detected from the image obtained in Step S54. If it is determined that a code symbol has been detected from the image (Step S57: Yes), the processing of the controller 41 proceeds to Step S58. On the other hand, if it is not determined that a code symbol has been detected from the image (Step S57: No), the processing of the controller 41 returns to the main routine.

If it is determined that a code symbol has been detected from the image (Step S57: Yes), in Step S58, the commodity input detecting unit 429 of the controller 41 reads the code information recorded in the detected code symbol.

Subsequently, the processing of the controller 41 returns to the main routine.

As described above, in the cart 20c (commodity pickup apparatus) of the second embodiment, the width of the cart 20c on the far side when viewed from the carrier who grips the handle 22 is formed narrower than the width on the near side. Further, the cart 20c includes the frame 212 (support member) for supporting the plurality of casters 23 (leg portions). Furthermore, the cart 20c includes the container installation frame 24c (fourth frame member), in which the far side when viewed from the carrier who grips the handle 22 is positioned higher than the near side, and which detachably mounts the plurality of accommodation portions 31. The commodity input detecting unit 429 (second detector) of the controller 41 determines whether the picked-up commodity is put in the correct position of the plurality of accommodation portions 31 from the image captured by the upper camera 62 (second imaging device). As described above, the upper camera 62 is installed in a position capable of capturing an image including all of the openings, through which commodities are input, of the plurality of accommodation portions 31 mounted on the container installation frame 24c. In addition to the above determination, the commodity input detecting unit 429 detects a feature amount for identifying the input commodity or a code symbol attached to the commodity from the images captured by the respective scanner cameras 33 (first imaging device). As described above, the scanner cameras 33 are provided to face the inside of the accommodation portions 31 at the outer edge portions 31a of the plurality of accommodation portions 31 mounted on the container installation frame 24c. Therefore, it is possible to reliably and easily recognize whether the picked-up commodity has been input in the correct position, i.e., the correct accommodation portion 31, and to reliably identify the input commodity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity pickup apparatus, including a plurality of accommodation portions that are detachably mounted thereon and accommodate commodities picked up in accordance with an order from a customer, and being movable in accordance with an operation by an operator, the commodity pickup apparatus comprising:
    a communication interface connectable to an external server;
    a display device; and
    a controller configured to
        obtain commodity pickup information including information related to a commodity to be picked up and a quantity thereof from the external server via the communication interface, and
        cause the display device to display a screen showing, for each of the plurality of accommodation portions, a list of commodities to be accommodated in said each of the plurality of accommodation portions on a basis of the obtained commodity pickup information such that the list is shown at a display position corresponding to a mount position of said each of the plurality of accommodation portions, wherein
    the commodity pickup apparatus further comprises:
        a plurality of leg portions that change a traveling direction of the commodity pickup apparatus in accordance with a direction of a force applied thereto;
        a support member that includes a handle and supports the plurality of leg portions, the support member having a width in a direction perpendicular to the traveling direction that is narrower on a far side of the operator than on a near side of the operator;
        a plurality of first frame members that are each disposed at a different level in a vertical direction and on which the plurality of accommodation portions are detachably mounted, wherein
            one of the first frame members at a lower level is closer to the operator than another of the first frame members at an upper level, and
            both ends of each of the first frame members in the direction perpendicular to the traveling direction are axially supported by the support member to be rotatable around horizontal axes perpendicular to the traveling direction; and
        a plurality of stopper members that hold the first frame members in parallel.

2. The commodity pickup apparatus according to claim 1, wherein
    the display device is attached to the handle to face the operator.

3. The commodity pickup apparatus according to claim 1, wherein
    the commodity pickup information further includes path information indicating a movement path for picking up commodities, and
    the controller is configured to cause the display device to display the movement path together with the list of commodities on the screen on a basis of the path information.

4. The commodity pickup apparatus according to claim 1, wherein
    the commodity pickup information includes information of the customer who has ordered commodities,
    the display device includes a touch panel that receives inputs from the operator, and
    the controller is configured to determine an accommodation portion in which a commodity ordered by the customer is to be accommodated among the plurality of accommodation portions in response to the inputs received via the touch panel.

5. The commodity pickup apparatus according to claim 1, wherein
the controller causes the display device to display, for each of the plurality of accommodation portions, the list of commodities on a basis of a setting of the accommodation portion in which a commodity is to be accommodated.

6. A commodity pickup apparatus, including a plurality of accommodation portions that are detachably mounted thereon and accommodate commodities picked up in accordance with an order from a customer, and being movable in accordance with an operation by an operator, the commodity pickup apparatus comprising:
a communication interface connectable to an external server;
a display device; and
a controller configured to:
obtain commodity pickup information including information related to a commodity to be picked up and a quantity thereof from the external server via the communication interface, and
cause the display device to display a screen showing, for each of the plurality of accommodation portions, a list of commodities to be accommodated in said each of the plurality of accommodation portions on a basis of the obtained commodity pickup information such that the list is shown at a display position corresponding to a mount position of said each of the plurality of accommodation portions, wherein
the commodity pickup apparatus further comprises:
a plurality of leg portions that change a traveling direction of the commodity pickup apparatus in accordance with a direction of a force applied thereto;
a support member that includes a handle and supports the plurality of leg portions, the support member having a width in a direction perpendicular to the traveling direction that is narrower on a far side of the operator than on a near side of the operator;
a second frame member that is installed substantially horizontally on the support member and on which the plurality of accommodation portions are detachably mounted; and
a third frame member on which the plurality of accommodation portions are detachably mounted, the third frame member being installed on the support member on a lower side and the near side relative to the second frame member such that a portion of the third frame member on the far side is higher than a portion of the third frame member on the near side.

7. The commodity pickup apparatus according to claim 6, further comprising:
a plurality of first imaging devices, the plurality of first imaging devices being provided at outer edge portions of the plurality of mounted accommodation portions to face inside of the plurality of accommodation portions, wherein
the controller is configured to
determine that a commodity picked up is put in a correct accommodation portion of the plurality of accommodation portions from images respectively captured by the plurality of first imaging devices, and
detect a commodity feature amount for identifying the commodity put in the accommodation portion or a code symbol attached to the commodity.

8. A commodity pickup apparatus, including a plurality of accommodation portions that are detachably mounted thereon and accommodate commodities picked up in accordance with an order from a customer, and being movable in accordance with an operation by an operator, the commodity pickup apparatus comprising:
a communication interface connectable to an external server;
a display device; and
a controller configured to:
obtain commodity pickup information including information related to a commodity to be picked up and a quantity thereof from the external server via the communication interface, and
cause the display device to display a screen showing, for each of the plurality of accommodation portions, a list of commodities to be accommodated in said each of the plurality of accommodation portions on a basis of the obtained commodity pickup information such that the list is shown at a display position corresponding to a mount position of said each of the plurality of accommodation portions, wherein
the commodity pickup apparatus further comprises:
a plurality of leg portions that change a traveling direction of the commodity pickup apparatus in accordance with a direction of a force applied thereto;
a support member that includes a handle and supports the plurality of leg portions, the support member having a width in a direction perpendicular to the traveling direction that is narrower on a far side of the operator than on a near side of the operator;
a fourth frame member on which the plurality of accommodation portions are detachably mounted, the fourth frame member being installed on the support member such that a portion of the fourth frame member on the far side is higher than a portion of the fourth frame member on the near side;
a plurality of first imaging devices that are provided at outer edge portions of the plurality of accommodation portions mounted on the forth frame member to face inside of the plurality of accommodation portions; and
a second imaging device that is installed on the support member to be capable of capturing an image including all of openings, through which commodities are put, of the plurality of accommodation portions mounted on the forth frame member, and
the controller is configured to:
determine that a commodity picked up is put in a correct accommodation portion of the plurality of accommodation portions from an image captured by the second imaging device, and
detect a commodity feature amount for identifying the commodity put in the accommodation portion or a code symbol attached to the commodity from images respectively captured by the plurality of first imaging devices.

* * * * *